US012246507B2

(12) United States Patent
Nadachi et al.

(10) Patent No.: US 12,246,507 B2
(45) Date of Patent: Mar. 11, 2025

(54) PRINTING DEVICE, PRINTER, AND BOX MAKING MACHINE

(71) Applicant: MITSUBISHI HEAVY INDUSTRIES MACHINERY SYSTEMS, LTD., Hyogo (JP)

(72) Inventors: Mitsuhiro Nadachi, Hyogo (JP); Kazuya Akita, Hyogo (JP); Makoto Shimohatsubo, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 122 days.

(21) Appl. No.: 18/037,023

(22) PCT Filed: Oct. 28, 2021

(86) PCT No.: PCT/JP2021/039855
§ 371 (c)(1),
(2) Date: May 15, 2023

(87) PCT Pub. No.: WO2022/102426
PCT Pub. Date: May 19, 2022

(65) Prior Publication Data

US 2024/0100799 A1 Mar. 28, 2024

(30) Foreign Application Priority Data

Nov. 16, 2020 (JP) ................................ 2020-190300

(51) Int. Cl.
*B31B 50/88* (2017.01)
*B31B 50/04* (2017.01)
(Continued)

(52) U.S. Cl.
CPC ........... *B31B 50/88* (2017.08); *B41J 2/17596* (2013.01); *B41J 3/286* (2013.01); *B41J 27/12* (2013.01);
(Continued)

(58) Field of Classification Search
CPC ...... B31B 50/88; B41J 3/286; B41F 13/0024; B41F 13/00; B41F 13/42
See application file for complete search history.

(56) References Cited

U.S. PATENT DOCUMENTS

2002/0113855 A1 8/2002 Baum
2006/0065144 A1 3/2006 Demoore et al.

FOREIGN PATENT DOCUMENTS

CN 108190408 A 6/2018
JP 2004209676 A 7/2004
(Continued)

OTHER PUBLICATIONS

International Search Report and Written Opinion of International Application No. PCT/JP2021/039855 mailed Jan. 18, 2022; 13pp.
(Continued)

*Primary Examiner* — Daniel Jeremy Leeds
(74) *Attorney, Agent, or Firm* — HAUPTMAN HAM, LLP

(57) ABSTRACT

A printing device, a printing machine, and a box making machine are provided with printing cylinders on which printing plates can be mounted, ink supply rolls that are placed on the upstream or downstream sides of the printing cylinders in a sheet-conveying direction and that can be in contact with the printing cylinders, ink supply units that can supply ink to the ink supply rolls, first covers that cover the upper parts of the printing cylinders in the vertical direction
(Continued)

and that can be opened and closed, and footholds that cover the vertically upper parts of the ink supply rolls and that can be operated by an operator.

15 Claims, 17 Drawing Sheets

(51) Int. Cl.

| | |
|---|---|
| ***B31B 50/07*** | (2017.01) |
| ***B31B 50/25*** | (2017.01) |
| ***B31B 50/62*** | (2017.01) |
| ***B41J 2/175*** | (2006.01) |
| ***B41J 3/28*** | (2006.01) |
| ***B41J 27/12*** | (2006.01) |
| ***B41J 29/13*** | (2006.01) |
| ***B41J 29/54*** | (2006.01) |

(52) U.S. Cl.
CPC ............... *B41J 29/13* (2013.01); *B41J 29/54* (2013.01); *B31B 50/042* (2017.08); *B31B 50/07* (2017.08); *B31B 50/25* (2017.08); *B31B 50/624* (2017.08)

(56) References Cited

FOREIGN PATENT DOCUMENTS

| | | | | |
|---|---|---|---|---|
| JP | 2008229910 A | * 10/2008 | .......... B41F 13/0024 |
| JP | 2015217535 A | 12/2015 | |
| JP | 2018089933 A | 6/2018 | |
| WO | 2009005088 A1 | 1/2009 | |

OTHER PUBLICATIONS

European Patent Office "Extended European Search Report for PCT/JP2021039855", Jun. 5, 2024, 7 pp.

* cited by examiner

PRINTING DEVICE, PRINTER, AND BOX MAKING MACHINE

RELATED APPLICATIONS

The present application is a National Phase of International Application Number PCT/JP2021/039855 filed Oct. 28, 2021, and claims priority of Japanese Application Number 2020-190300 filed Nov. 16, 2020.

TECHNICAL FIELD

The present disclosure relates to a printing device that performs printing on a sheet, such as a corrugated board, a printer including the printing device, and a box making machine including the printer.

BACKGROUND ART

A box making machine manufactures a box body (corrugated cardboard box) by processing a corrugated board. The box making machine includes a feeding section, a printing section, a slotter creaser section, a die cutting section, a folding section, a counter-ejector section, and the like. The feeding section feeds out the corrugated boards stacked on a table one by one and feeds the corrugated boards to the printing section at a regular speed. The printing section includes a plurality of printing units and performs printing on the corrugated board. The slotter creaser section forms a creasing line as a fold line on the corrugated board, cut an end portion of the corrugated board, and performs processing of a groove as a flap or a gluing margin strip for joining. The die cutting section performs punching processing of a hand hole or the like on the corrugated board. The folding section manufactures a flat corrugated cardboard box by applying glue to the gluing margin strip of the corrugated board, folding the gluing margin strip along the creasing line, and joining the gluing margin strip. The counter-ejector section stacks the corrugated cardboard boxes, sorts the corrugated cardboard boxes into a predetermined number of batches, and ejects the corrugated cardboard boxes.

The printing section of the box making machine can perform multicolor printing on a surface of the corrugated board to be transferred. Therefore, in the printing section, the plurality of printing units are disposed in series in a transfer direction of the corrugated board. The plurality of printing units have substantially the same configurations. The printing unit includes a printing cylinder, an ink supply roll, an ink supply section, and an impression roll. The printing cylinder is equipped with a printing plate on an outer peripheral portion and is supported to be rotatable. The ink supply roll is supported to be rotatable and supplies ink of the ink supply section to the printing plate of the printing cylinder. The impression roll is disposed below the printing cylinder and interposes the corrugated board with the printing cylinder. Therefore, when the corrugated board is transferred between the printing cylinder and the impression roll, the ink of the printing plate is transferred to the surface of the corrugated board, so that the printing is performed. As the box making machine including such a printing section, there is a box making machine disclosed in PTL 1.

CITATION LIST

Patent Literature

[PTL 1] Japanese Unexamined Patent Application Publication No. 2015-217535

SUMMARY OF INVENTION

Technical Problem

In a printing section disposed in a box making machine in the related art, a plurality of printing units are disposed along a transfer direction of a corrugated board. In the printing section unit, a printing cylinder and an impression roll are disposed vertically, and an ink supply roll and an ink supply section are disposed on a side of the printing cylinder. The printing unit is configured to accommodate the printing cylinder, the ink supply roll, the ink supply section, and the impression roll inside a housing. In the printing section, a foothold for securing a work space is provided between the plurality of printing units. The foothold is, for example, a space for an operator to replace a printing plate for the printing cylinder. Since one foothold is provided for one printing unit, a total length of the printing section is long. Therefore, a space for disposing the box making machine is large, and it is desired to reduce the total length of the printing section.

The present disclosure has been made to solve the problems described above, and an object thereof is to provide a printing device, a printer, and a box making machine for reducing a size of the device.

Solution to Problem

In order to achieve the above object, the present disclosure relates to a printing device including a printing cylinder on which a printing plate is mountable, an ink supply roll that is disposed on an upstream side or a downstream side of the printing cylinder in a sheet transfer direction and is contactable with the printing cylinder, an ink supply section that is configured to supply ink to the ink supply roll, a first cover that covers an upper side of the printing cylinder in a vertical direction and is openable and closable, and a foothold that covers an upper side of the ink supply roll in the vertical direction and on which an operator is able to perform work.

In addition, the present disclosure relates to a printer in which a plurality of the printing devices are disposed at predetermined intervals in the sheet transfer direction, and the foothold is disposed above the plurality of printing devices.

In addition, the present disclosure relates to a box making machine including a feeding section that supplies a sheet, a printing section that performs printing on the sheet, a slotter creaser section that performs end portion cutting processing, creasing line processing, and grooving processing on the sheet, a folding section that folds the sheet and joins end portions to form a box body, and a counter-ejector section that stacks the box bodies while counting the number of the box bodies, and then ejects the box bodies for each predetermined number, in which the printing section includes the printer.

Advantageous Effects of Invention

With the printing device, the printer, and the box making machine according to the present disclosure, it is possible to reduce the size of the device.

DESCRIPTION OF EMBODIMENTS

Hereinafter, a preferred embodiment of the present disclosure will be described in detail with reference to the drawings. It should be noted that the present disclosure is not limited to the embodiment, and includes a configuration in which embodiments are combined in a case in which there are a plurality of embodiments. In addition, components in the embodiment include components that can be easily assumed by those skilled in the art, components that are substantially the same, and components having a so-called equivalent range.

<Box Making Machine>

Figure 1:
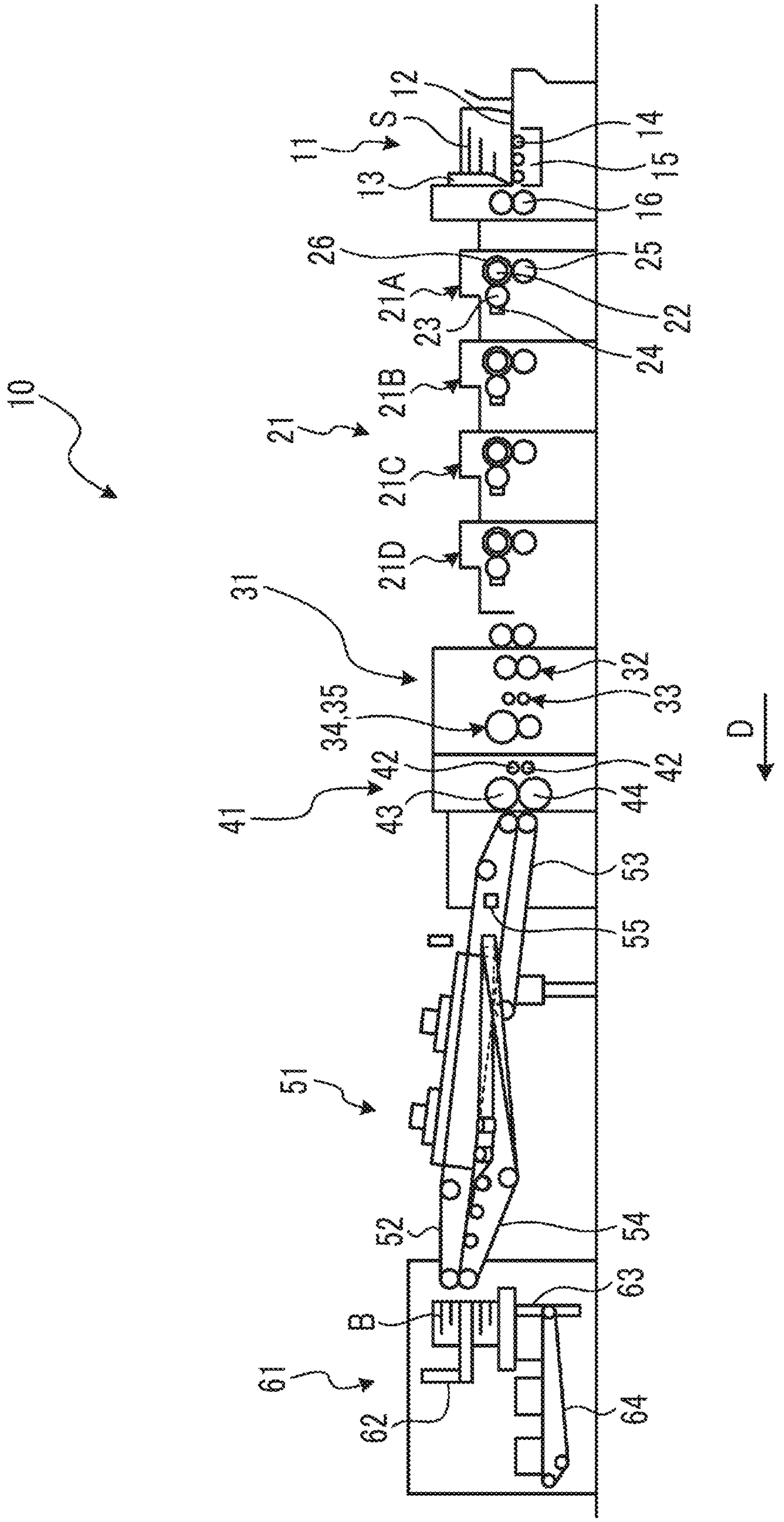
FIG. 1 is a schematic view showing a box making machine according to the present embodiment.

FIG. 1 is a schematic view showing a box making machine according to the present embodiment. Hereinafter, a horizontal direction in which a corrugated board S and a corrugated cardboard box B are transferred is referred to as a transfer direction D, and a horizontal direction orthogonal to the transfer direction D is referred to as a width direction W.

In the present embodiment, as shown in FIG. 1, a box making machine 10 manufactures the corrugated cardboard box (box body) B by processing the corrugated board S. The box making machine 10 includes a feeding section 11, a printing section 21, a slotter creaser section 31, a die cutting section 41, a folding section 51, and a counter-ejector section 61. In the box making machine 10, the feeding section 11, the printing section 21, the slotter creaser section 31, the die cutting section 41, the folding section 51, and the counter-ejector section 61 are disposed linearly along the transfer direction D.

The feeding section 11 feeds out the corrugated boards S one by one and feeds the corrugated boards S to the printing section 21 at a regular speed. The feeding section 11 includes a table 12, a front guide 13, a feed roller 14, a suction device 15, and a feed roll 16. The table 12 is supported such that a large number of the corrugated boards S can be stacked and placed on the table 12 and can move up and down. The front guide 13 can position a front end position of the corrugated boards S stacked on the table 12, and a gap through which one corrugated board S can pass is secured between a lower end portion and the table 12. A plurality of the feed rollers 14 are disposed in the transfer direction D of the corrugated board S corresponding to the table 12, and feeds out the corrugated board S at the lowest position among a large number of the stacked corrugated boards S forward when the table 12 moves down. The suction device 15 sucks the stacked corrugated boards S downward, that is, to the table 12 or the feed roller 14 side. The feed roll 16 supplies the corrugated board S fed out by the feed roller 14 to the printing section 21.

The printing section 21 performs multicolor printing (four-color printing in the present embodiment) on a surface of the corrugated board S. In the printing section 21, four printing units 21A, 21B, 21C, and 21D are disposed in series, and the printing is performed using four ink colors on the surface of the corrugated board S. The printing units 21A, 21B, 21C, and 21D are configured in substantially the same manner, and include a printing cylinder 22, an ink supply roll (anilox roll) 23, an ink supply section 24, and an impression roll 25. A printing plate 26 can be mounted on an outer peripheral portion of the printing cylinder 22.

The slotter creaser section 31 has a function of performing creasing line processing, a function of performing cutting processing, and a function of performing grooving processing on the corrugated board S. The slotter creaser section 31 includes a first creasing roll 32, a second creasing roll 33, a slitter head 34, and a slotter head 35. A plurality (in the present embodiment, four) of the first creasing rolls 32 are disposed at predetermined intervals in the horizontal direction (width direction of the corrugated board S) orthogonal to the transfer direction D of the corrugated board S, and can be rotated by a drive device (not shown). A plurality (in the present embodiment, four) of the second creasing rolls 33 are disposed at predetermined intervals in the horizontal direction orthogonal to the transfer direction D of the corrugated board S, and can be rotated by the drive device (not shown). In the first creasing roll 32 and the second creasing roll 33, the creasing line processing is performed on a back surface (lower surface) of the corrugated board S.

A plurality of the slitter heads 34 and the slotter heads 35 (in the present embodiment, a total of five) are disposed at predetermined intervals in the horizontal direction orthogonal to the transfer direction D of the corrugated board S, and can be rotated by the drive device (not shown). One slitter head 34 is configured, is provided corresponding to an end portion of the corrugated board S to be transferred, in the width direction, and cuts the end portion of the corrugated board S in the width direction. Four slotter head 35 are configured, are provided corresponding to predetermined positions of the corrugated board S to be transferred, in the width direction, and perform gluing margin strip processing together with the grooving processing at the predetermined positions in the corrugated board S.

The die cutting section 41 performs punching processing of a hand hole or the like on the corrugated board S. The die cutting section 41 includes a pair of upper and lower feed pieces 42, an anvil cylinder 43, and a knife cylinder 44. The feed pieces 42 transfer the corrugated board S by interposing the corrugated board S from above and below, and are provided to be rotatable. The anvil cylinder 43 and the knife cylinder 44 are each formed in a circular shape, and can be rotated synchronously by the drive device (not shown). In this case, an anvil is formed on an outer peripheral portion of the anvil cylinder 43, while a die is formed at a predetermined position on an outer peripheral portion of the knife cylinder 44.

The folding section 51 folds the corrugated board S while moving the corrugated board S in the transfer direction D, and joins both end portions in the width direction to form a flat corrugated cardboard box B. The folding section 51 includes an upper transfer belt 52, a lower transfer belt 53, and a forming belt 54. The upper transfer belt 52, the lower transfer belt 53, and the forming belt 54 transfer the corrugated board S by interposing the corrugated board S and the corrugated cardboard box B from above and below. The forming belt 54 folds the corrugated board S while bending each end portion in the width direction downward. In addition, a gluing device 55 is provided in the folding section 51. The gluing device 55 includes a glue gun, and discharges the glue at a predetermined timing to perform gluing at a predetermined position on the corrugated board S.

The counter-ejector section 61 stacks the corrugated cardboard boxes B while counting the corrugated cardboard boxes B, sorts the corrugated cardboard boxes B into a predetermined number of batches, and then ejects the corrugated cardboard boxes B. The counter-ejector section 61 includes a ledge device 62 that sorts the stacked corrugated cardboard boxes into the predetermined number of batches. An elevator 63 is provided below the ledge device 62 to be movable up and down. The elevator 63 moves down the corrugated cardboard box B sorted into the batch to a position of a transfer conveyor 64 downstream. It should be noted that the counter-ejector section 61 includes a front plate and a square plate (which are not shown) as shaping means.

<Printing Section>

Figure 2:
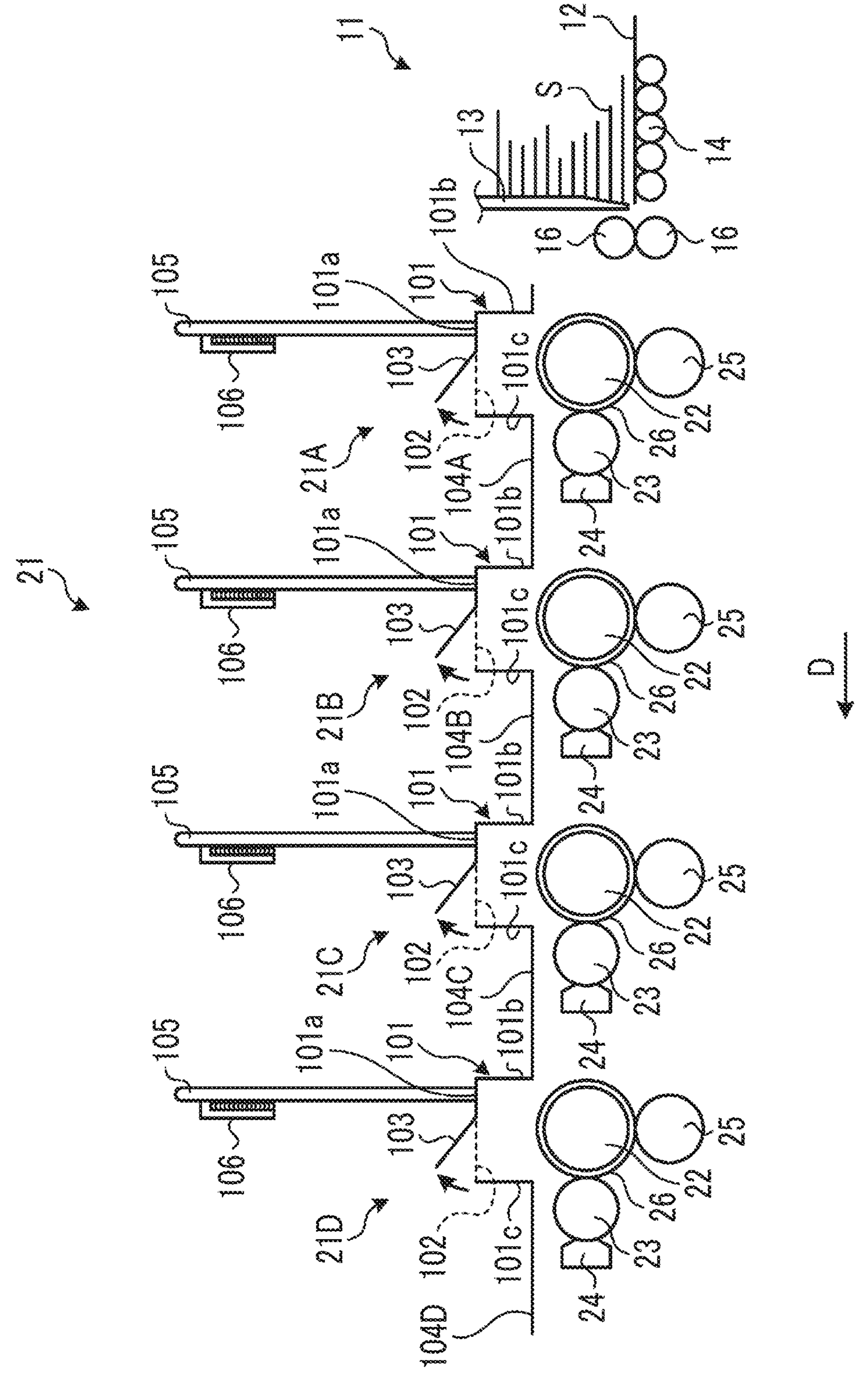
FIG. 2 is a side view showing a printing section according to the present embodiment.

A printer according to the present invention is applied to the printing section 21 of the box making machine 10, and a printing device according to the present invention is applied to the printing units 21A, 21B, 21C, and 21D. FIG. 2 is a side view showing the printing section according to the present embodiment, and FIG. 3 is a plan view showing the printing section according to the present embodiment.

Figure 3:
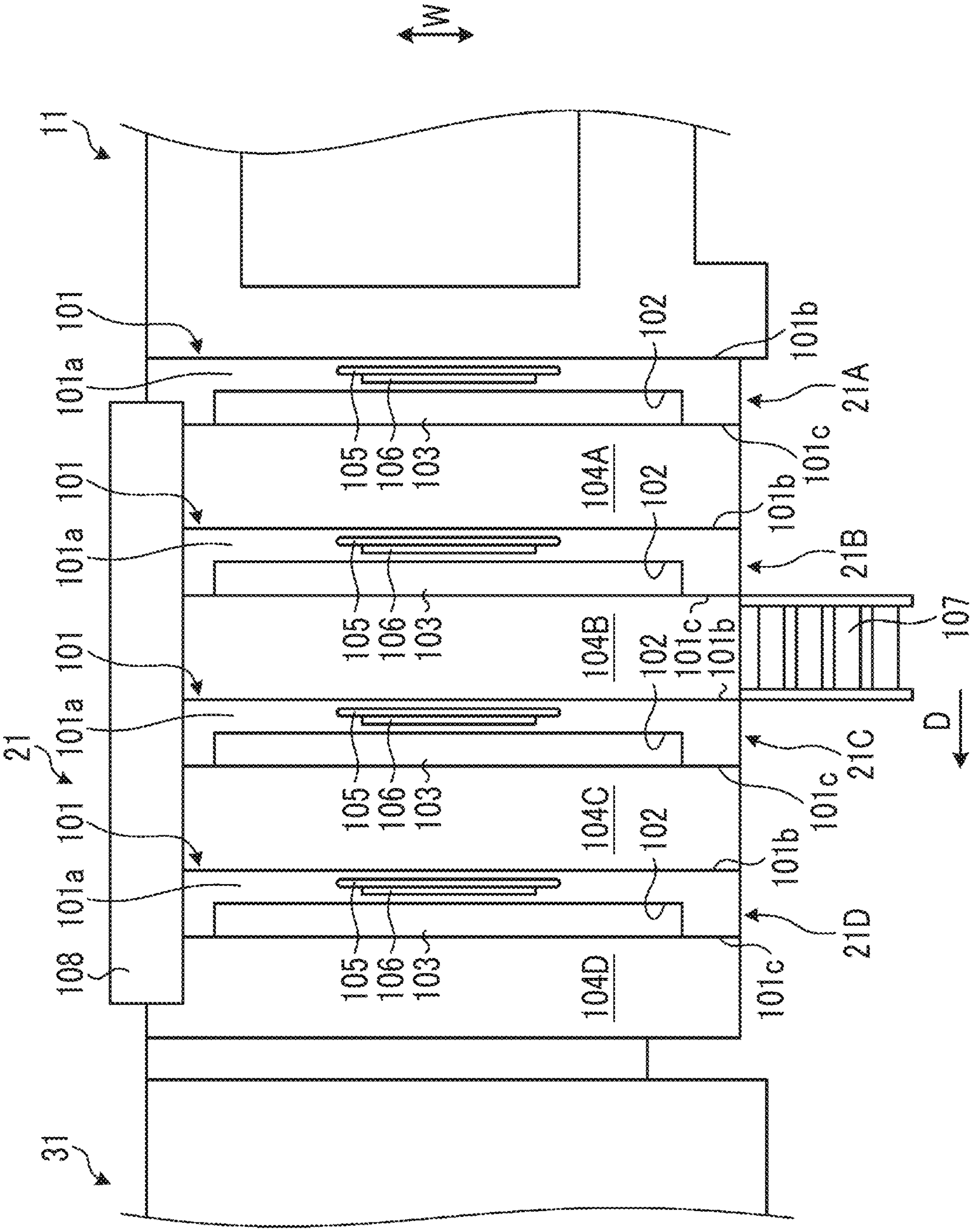
FIG. 3 is a plan view showing the printing section according to the present embodiment.

In the present embodiment, as shown in FIGS. 2 and 3, for example, in the printing section 21, four printing units 21A, 21B, 21C, and 21D are disposed along the transfer direction D. The four printing units 21A, 21B, 21C, and 21D are configured in substantially the same manner. The printing units 21A, 21B, 21C, and 21D include the printing cylinder 22, the ink supply roll 23, the ink supply section 24, and the impression roll 25.

In the printing units 21A, 21B, 21C, and 21D, the printing cylinder 22 is accommodated inside a housing 101. The housing 101 includes a ceiling 101*a* disposed on an upper side of the printing cylinder 22 in a vertical direction, and vertical wall portions 101*b* and 101*c* disposed on an upstream side and a downstream side of the printing cylinder 22 in the transfer direction D. In the housing 101, a work opening 102 for the printing cylinder is provided in the ceiling 101*a*. The work opening 102 for the printing cylinder has a rectangular shape, has a length in the transfer direction D which is substantially the same length as a diameter of the printing cylinder 22, and has a length in the width direction W which is a length longer than a width of the printing plate 26 mounted on the printing cylinder 22. The housing 101 is provided with a first cover 103 that can open and close the work opening 102 for the printing cylinder.

The first cover 103 covers an upper side of the printing cylinder 22 in the vertical direction, and can open and close the work opening 102 for the printing cylinder. That is, footholds 104A, 104B, 104C, and 104D are provided with the work opening 102 for the printing cylinder above the printing cylinders 22 configuring the printing units 21A, 21B, 21C, and 21D, and the first cover 103 can open and close the work opening 102 for the printing cylinder. In this case, the first cover 103 can be opened upward from the downstream side to the upstream side of the housing 101 in the transfer direction D with the upstream side of the housing 101 in the transfer direction D as a fulcrum.

In the printing units 21A, 21B, 21C, and 21D, the footholds 104A, 104B, 104C, and 104D are disposed on the downstream side in the transfer direction D. The ceiling 101*a* and the first cover 103 of the housing 101 are disposed on an upper side of the footholds 104A, 104B, 104C, and 104D in the vertical direction. That is, there is a step between the first cover 103 and the footholds 104A, 104B, 104C, and 104D. An operator can open and close the first cover 103 on the upstream side of the footholds 104A, 104B, 104C, and 104D in the transfer direction D.

The housing 101 is provided with a handrail 105 on the ceiling 101*a*. The handrail 105 is disposed on an upstream side of the ceiling 101*a* in the transfer direction D and at an intermediate position in the width direction W. A printing plate holding brush 106 is mounted to the handrail 105. The printing plate holding brush 106 can hold the printing plate 26. In the foothold 104B, for example, a staircase 107 on which the operator can move up and down is disposed on one side in the width direction W, and a printing plate storage place 108 is disposed on the other side in the width direction W. The staircase 107 is for the operator to move between a floor surface and the foothold 104B. The printing plate storage place 108 is for temporarily placing the printing plate 26 that has been used or the printing plate 26 to be used in the future.

It should be noted that the staircase 107 is disposed on one side of the foothold 104B in the width direction W, but the staircase 107 may be disposed on the other side in the width direction W, or a plurality of the staircases 107 may be provided in other footholds 104A, 104C, and 104D.

In addition, the printing plate storage place 108 is disposed on the other side of the foothold 104B in the width direction W, but the printing plate storage place 108 may be disposed one side in the width direction W. Also, as long as the operator can reach the printing plate storage place 108 from the footholds 104A, 104B, 104C, and 104D, the printing plate storage place 108 may be, for example, an intermediate position of the footholds 104A, 104B, 104C, and 104D in the width direction W, or may be the feeding section 11 or the slotter creaser section 31.

<Printing Unit>

Figure 4:
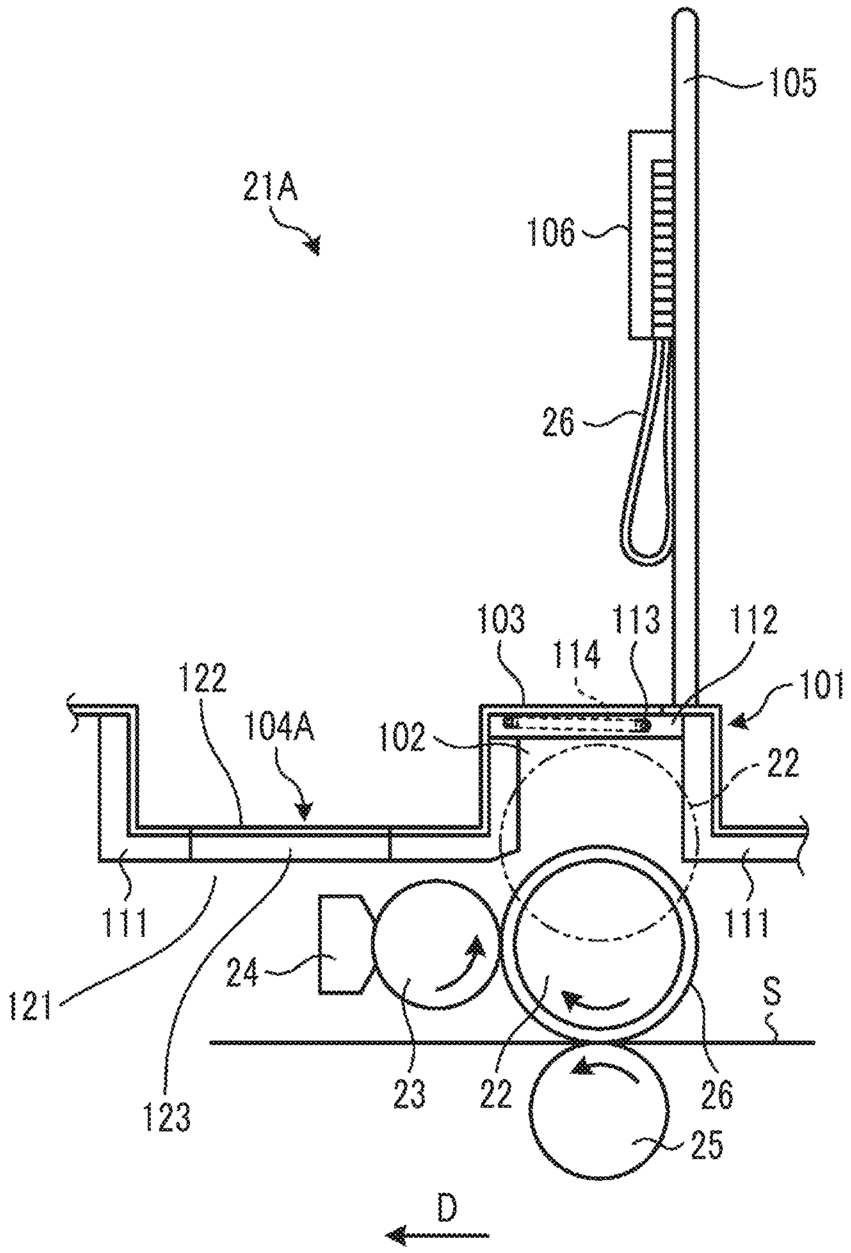
FIG. 4 is a schematic view showing a printing unit.
Figure 5:
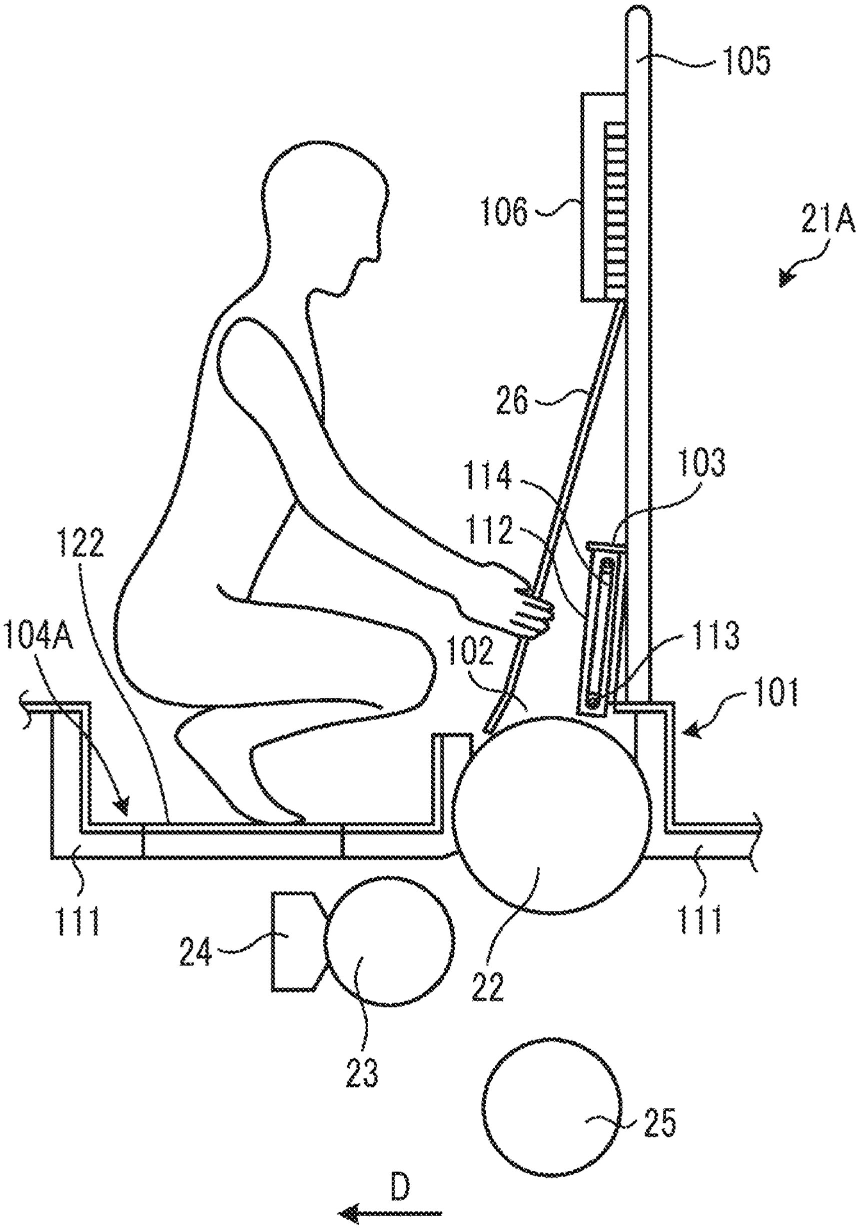
FIG. 5 is a schematic view showing printing plate replacement work in the printing unit.

FIG. 4 is a schematic view showing the printing unit, and FIG. 5 is a schematic view showing printing plate replacement work in the printing unit. Since the printing units 21A, 21B, 21C, and 21D have substantially the same configuration, hereinafter, the printing unit 21A will be described.

As shown in FIG. 4, the printing unit 21A includes the printing cylinder 22, the ink supply roll 23, the ink supply section 24, and the impression roll 25. The printing cylinder 22 is accommodated inside the housing 101. The printing cylinder 22 is disposed along the width direction W, and one end portion and the other end portion in an axial direction are supported to be rotatable by a frame via a bearing (not shown). The printing cylinder 22 can be driven and rotated by the drive device (not shown). In the printing cylinder 22, the printing plate 26 is detachable from the outer peripheral portion.

The ink supply roll 23 is disposed on the downstream side of the printing cylinder 22 in the transfer direction D. The ink supply roll 23 can contact with the printing plate 26 of the printing cylinder 22. The ink supply section 24 is disposed on the downstream side of the ink supply roll 23 in the transfer direction D. The ink supply section 24 includes an ink chamber, and can store ink supplied from the outside therein. In the ink supply section 24, an opening of the ink chamber closely contacts with an outer peripheral surface of the ink supply roll 23 without a gap, and a part of the stored ink is supplied to the outer peripheral surface of the ink supply roll 23. The ink supply roll 23 and the ink supply section 24 are disposed below the foothold 104A. The impression roll 25 is disposed below the printing cylinder 22 and can contact with the printing cylinder 22.

Therefore, when the printing cylinder 22, the ink supply roll 23, and the impression roll 25 are rotated, the ink of the ink supply section 24 is supplied to the printing plate 26 of the printing cylinder 22 via the ink supply roll 23. Then, when the corrugated board S is transferred while being interposed between the printing cylinder 22 and the impression roll 25, the ink of the printing plate 26 of the printing cylinder 22 is transferred to the surface of the corrugated board S to perform the printing.

The printing cylinder 22 can move up and down along the vertical direction. One end portion and the other end portion of the printing cylinder 22 in the axial direction are supported to be rotatable by the frame via the bearing. An elevating device (not shown) moves up and down the printing cylinder 22 by, for example, moving up and down each bearing. The printing cylinder 22 can move between a printing position and a work position by the elevating device. The printing position of the printing cylinder 22 is a position at which the printing cylinder 22 moves down and contacts with the ink supply roll 23 and the impression roll 25. The work position of the printing cylinder 22 is a position at which the printing cylinder 22 moves up from the printing position and various types of work can be performed from the work opening 102 for the printing cylinder. The position at which the work can be performed is, for example, a position at which a part of the outer peripheral surface of the printing cylinder 22 is exposed to the upper portion of the foothold 104A in the vertical direction. The various types of work include, for example, attachment work of the printing plate 26 to the printing cylinder 22, detachment work, adjustment work of an attachment position, cleaning work, and the like.

The foothold 104A is provided with a second cover 122 that can open and close a work opening 121 for the ink supply section. On the housing 101, the first cover 103, the second cover 122, and the foothold 104A, the operator can walk and can get on to perform various types of work. Therefore, the housing 101, the first cover 103, the second cover 122, and the foothold 104A are provided with reinforcing portions such that sufficient strength is secured. For example, the reinforcing portion is a reinforcing member, such as a plurality of flange portions 111 fixed to inner surfaces of the housing 101 and the foothold 104A, a plurality of flange portions 112 fixed to an inner surface of the first cover 103, or a plurality of flange portions 123 fixed to an inner surface of the second cover 122. In addition, in the housing 101, the first cover 103, the second cover 122, and the foothold 104A, it is preferable to use an iron plate as the reinforcing portion for securing sufficient strength or increase a plate thickness.

The first cover 103 can be opened and closed by a hand of the operator. The first cover 103 is supported to be rotationally movable by the housing 101 by a supporting shaft 113 along the width direction W. The supporting shaft 113 that supports the first cover 103 to be rotationally movable is positioned on the upstream side of the center of the printing cylinder 22 in the transfer direction D. For example, a gas spring 114 is mounted between the first cover 103 and the housing 101. The gas spring 114 applies an urging force in an opening direction of the first cover 103. Therefore, even when the first cover 103 is a heavy object, the operator can open the first cover 103 by a hand with a small operating force by being assisted by the urging force of the gas spring 114 from the foothold 104A.

The printing cylinder 22 is positioned at the printing position during printing and moves up to the work position when printing ends. Then, when the printing cylinder 22 is positioned at the work position, the operator opens the first cover 103 and performs the replacement work of the printing plate 26. Here, in consideration of the safety, a locking mechanism that prevents the first cover 103 from being opened while the printing cylinder 22 is in operation is provided. For example, when the printing cylinder 22 is positioned at the printing position, the locking mechanism mechanically locks the first cover 103 to the housing 101. In addition, the locking mechanism electrically detects that the printing cylinder 22 is positioned at the work position and locks the first cover 103 to the housing 101. It should be noted that the second cover 122 will be described below.

As shown in FIG. 5, the operator moves to the foothold 104A when performing the printing plate replacement work of the printing unit 21A. The operator gets on the foothold 104A and opens the first cover 103. The printing cylinder 22 moves up from the printing position to the work position, and the operator can access the printing cylinder 22 through the work opening 102 for the printing cylinder. First, the operator holds the printing plate 26, which is to be newly mounted, by the printing plate holding brush 106. Next, the printing plate 26 mounted on the printing cylinder 22 is removed, and the removed printing plate 26 is temporarily placed in the printing plate storage place 108 (see FIG. 3). Then, the printing plate 26 held by the printing plate holding brush 106 is wound around the printing cylinder 22 and mounted. When the printing plate 26 is mounted on the printing cylinder 22, the operator closes the work opening 102 for the printing cylinder by the first cover 103.

Here, the operator winds and mounts the printing plate 26 held by the printing plate holding brush 106 around the printing cylinder 22, but the present disclosure is not limited to this mounting method. For example, the operator may place the printing plate 26 in a rolled state on his/her feet side without using the printing plate holding brush 106, and may wind and mount the printing plate 26, which is rolled on his/her feet side, around the printing cylinder 22.

As shown in FIGS. 2 and 3, when the printing plate replacement work of the printing unit 21A ends, the operator performs the printing plate replacement work of another printing unit 21B. In this case, the operator uses the housing 101 and the first cover 103 as the footholds and moves from the foothold 104A to the foothold 104B. Then, the operator gets on the foothold 104B and performs the printing plate replacement work of the printing unit 21B. When the printing plate replacement work of the printing unit 21B ends, the operator performs the printing plate replacement work of the printing units 21C and 21D in order. In this case, the operator uses the housing 101 and the first cover 103 as the footholds and moves from the foothold 104B to the footholds 104C and 104D to perform the work.

<Modification Example of Printing Unit>

Figure 6:
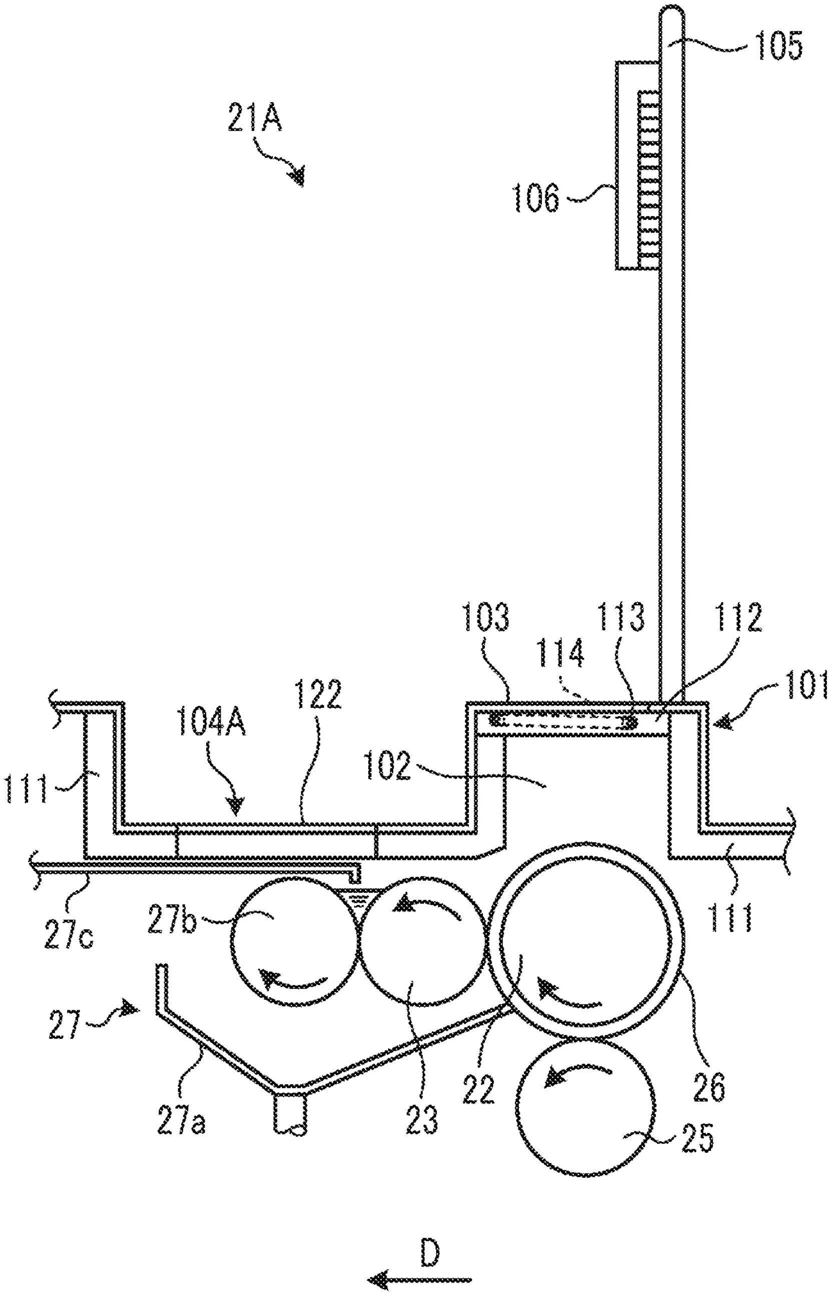
FIG. 6 is a schematic view showing a first modification example of the printing unit.
Figure 7:
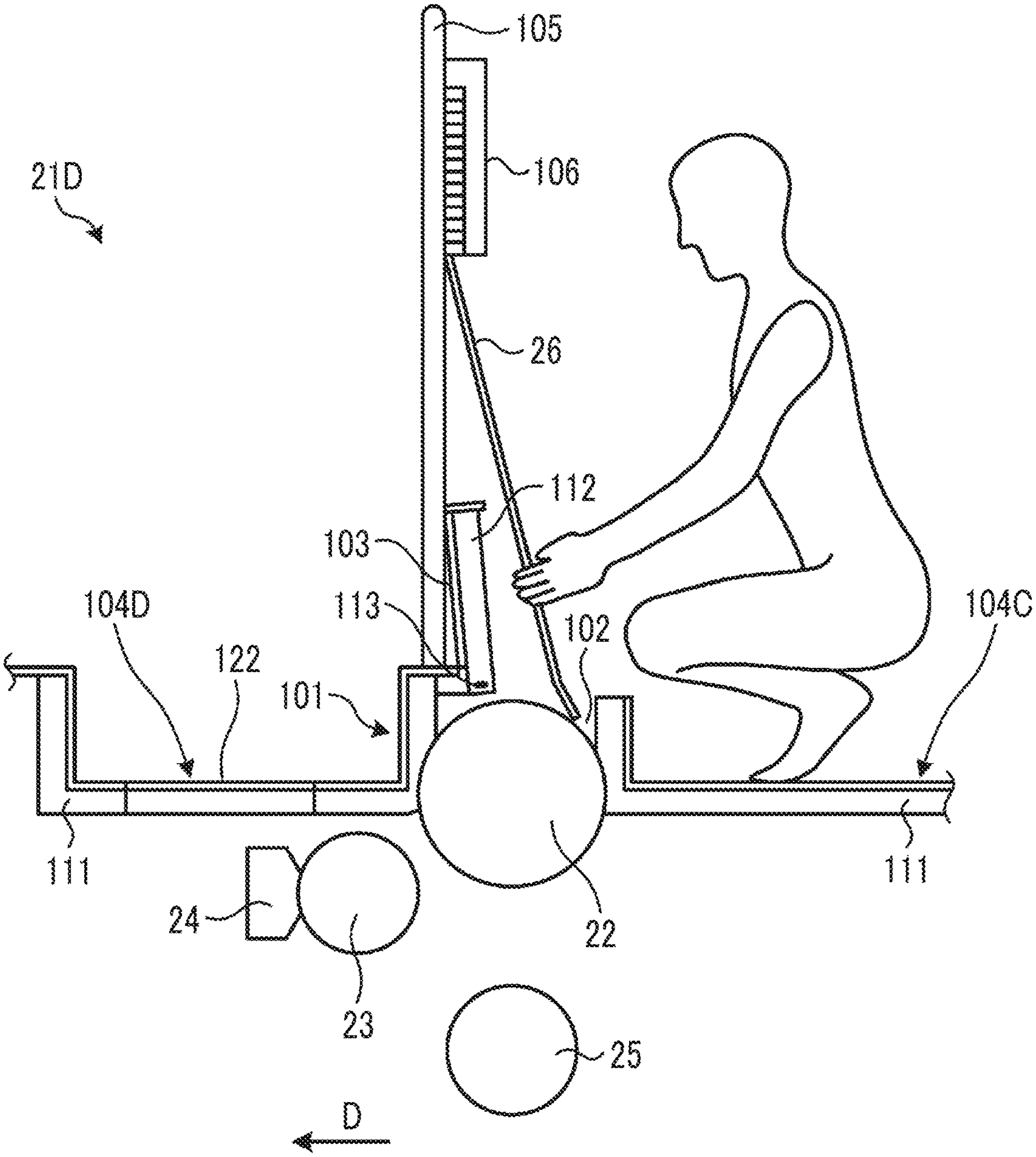
FIG. 7 is a schematic view showing a second modification example of the printing unit.

It should be noted that the configurations of the printing units 21A, 21B, 21C, and 21D, the printing plate replacement work, and the like are not limited to the configurations, the printing plate replacement work, and the like described above. FIG. 6 is a schematic view showing a first modification example of the printing unit, and FIG. 7 is a schematic view showing a second modification example of the printing unit.

In the first modification example of the printing unit, as shown in FIG. 6, the printing unit 21A includes the printing cylinder 22, the ink supply roll 23, an ink supply section 27, and the impression roll 25. The printing cylinder 22, the ink supply roll 23, and the impression roll 25 are the same as the printing cylinder 22, the ink supply roll 23, and the impression roll 25 described above. The ink supply section 27 includes an ink recovery pan 27*a* and an ink scraping roll 27*b*. The ink is supplied from an ink supply pipe 27*c* and is stored above a contact portion between the ink supply roll 23 and the ink scraping roll 27*b*. The ink stored in the contact portion adheres to the outer peripheral surface of the ink supply roll 23. The ink flowing out from end portions of the ink supply roll 23 and the ink scraping roll 27*b* is recovered by the ink recovery pan 27*a* and is supplied again. It should be noted that the ink supply roll 23 and the ink supply section 27 are disposed below the foothold 104A.

Therefore, when the printing cylinder 22, the ink supply roll 23, and the impression roll 25 are rotated, the ink of the ink supply section 27 is supplied to the printing plate 26 of the printing cylinder 22 via the ink supply roll 23. Then, when the corrugated board S is transferred while being interposed between the printing cylinder 22 and the impression roll 25, the ink of the printing plate 26 of the printing cylinder 22 is transferred to the surface of the corrugated board S to perform the printing.

In the second modification example of the printing unit, as shown in FIG. 2, in the printing section 21, an inspection device may be disposed above the foothold 104D and on the downstream side of the printing unit 21D in the transfer direction D. The inspection device inspects a quality of a pattern printed on the corrugated board S. When the inspection device is disposed above the foothold 104D, when the operator performs the printing plate replacement work in the printing unit 21D on the foothold 104D, for example, the operator may block a field of view of a camera of the inspection device. In the second modification example, the operator can perform the printing plate replacement work in the printing unit 21D on the foothold 104C positioned on the upstream side of the printing unit 21D in the transfer direction D.

As shown in FIG. 7, in the printing unit 21D, the printing cylinder 22 is accommodated inside the housing 101. The housing 101 is provided with the work opening 102 for the printing cylinder, and can be opened and closed by the first cover 103. The first cover 103 can be opened and closed by a hand of the operator from the foothold 104C. The first cover 103 is mounted to be rotationally movable on the housing 101 by a supporting shaft 113 along the width direction W. The supporting shaft 113 that supports the first cover 103 to be rotationally movable is positioned on the downstream side of the center of the printing cylinder 22 in the transfer direction D. Therefore, the operator can open the first cover 103 of the printing unit 21D from the foothold 104*d*.

<Modification Example of Foothold>

Figure 8:
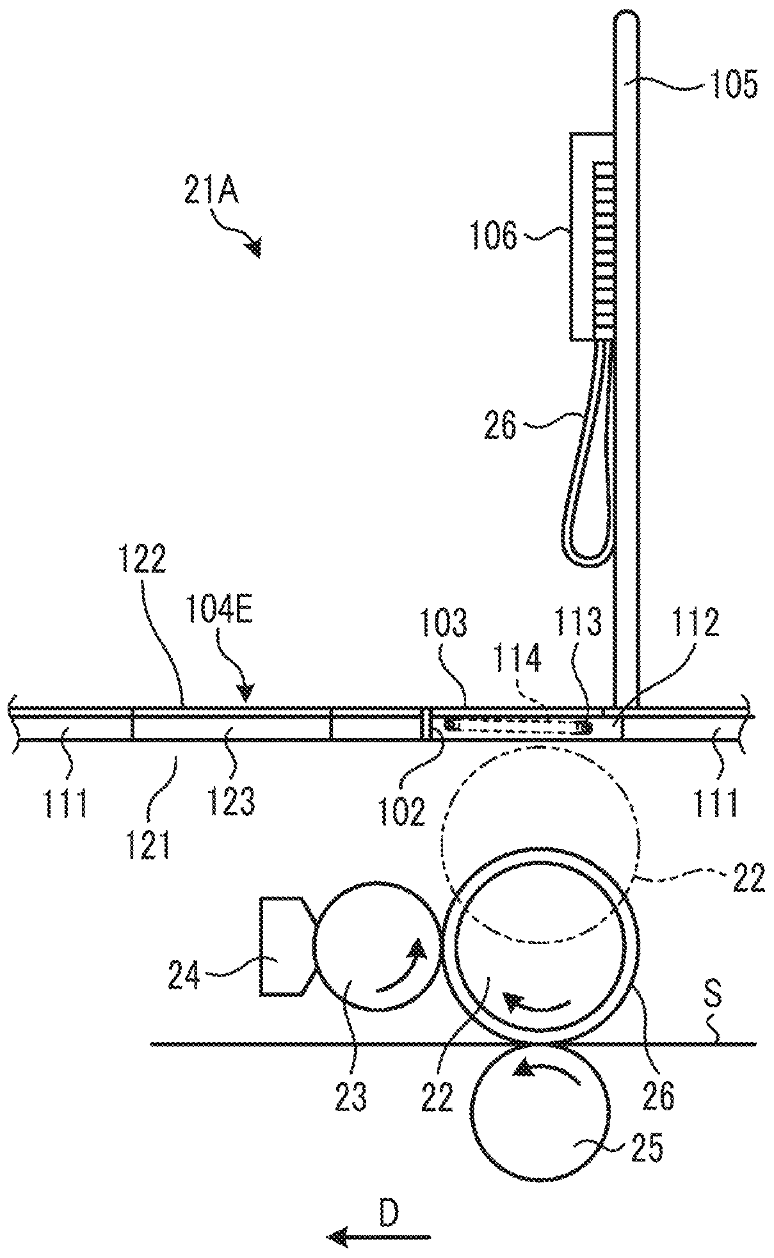
FIG. 8 is a schematic view showing a modification example of a foothold.

In addition, the configurations of the footholds 104A, 104B, 104C, and 104D are not limited to the configurations described above. FIG. 8 is a schematic view showing a modification example of the foothold.

As shown in FIG. 8, the printing unit 21A includes the printing cylinder 22, the ink supply roll 23, the ink supply section 24, and the impression roll 25. A foothold 104E is disposed above the printing unit 21A. The foothold 104E is provided horizontally without a step along the transfer direction D and the width direction W of the printing unit 21A. Then, the foothold 104E functions as a housing of the printing unit 21A. It should be noted that the foothold 104E is configured by combining a plurality of foothold bodies, which are separately provided for each of the printing units 21A, 21B, 21C, and 21D, to be linearly connected to each other. It should be noted that the foothold 104E is not limited to this configuration. For example, the foothold 104A integrated with each of the printing units 21A, 21B, 21C, and 21D may be provided. It is preferable that the foothold 104E has an upper surface having a continuous flat shape without a step in each of the printing units 21A, 21B, 21C, and 21D.

The foothold 104E is provided with the first cover 103 that can open and close the work opening 102 for the printing cylinder. The first cover 103 covers the upper side of the printing cylinder 22 in the vertical direction, and can open and close the work opening 102 for the printing cylinder. The first cover 103 can be opened upward from the downstream side to the upstream side of the foothold 104E in the transfer direction D with the upstream side of the foothold 104E in the transfer direction D as a fulcrum. The printing cylinder 22 can move up and down along the vertical direction. The printing cylinder 22 can move between the printing position and the work position by the elevating device.

On the first cover 103 and the foothold 104E, the operator can walk and can get on to perform various types of work. Therefore, the first cover 103 and the foothold 104E are provided with reinforcing portions such that sufficient strength is secured. For example, the reinforcing portion is a reinforcing member, such as a plurality of flange portions 111 fixed to the inner surface of the foothold 104E or a plurality of flange portions 112 fixed to the inner surface of the first cover 103. It should be noted that the opening/closing mechanism of the first cover 103 is the same as the configuration described above. In addition, the printing plate replacement work of the printing unit 21A is the same as the printing plate replacement work described above.

<Modification Example of First Cover>

Figure 9:
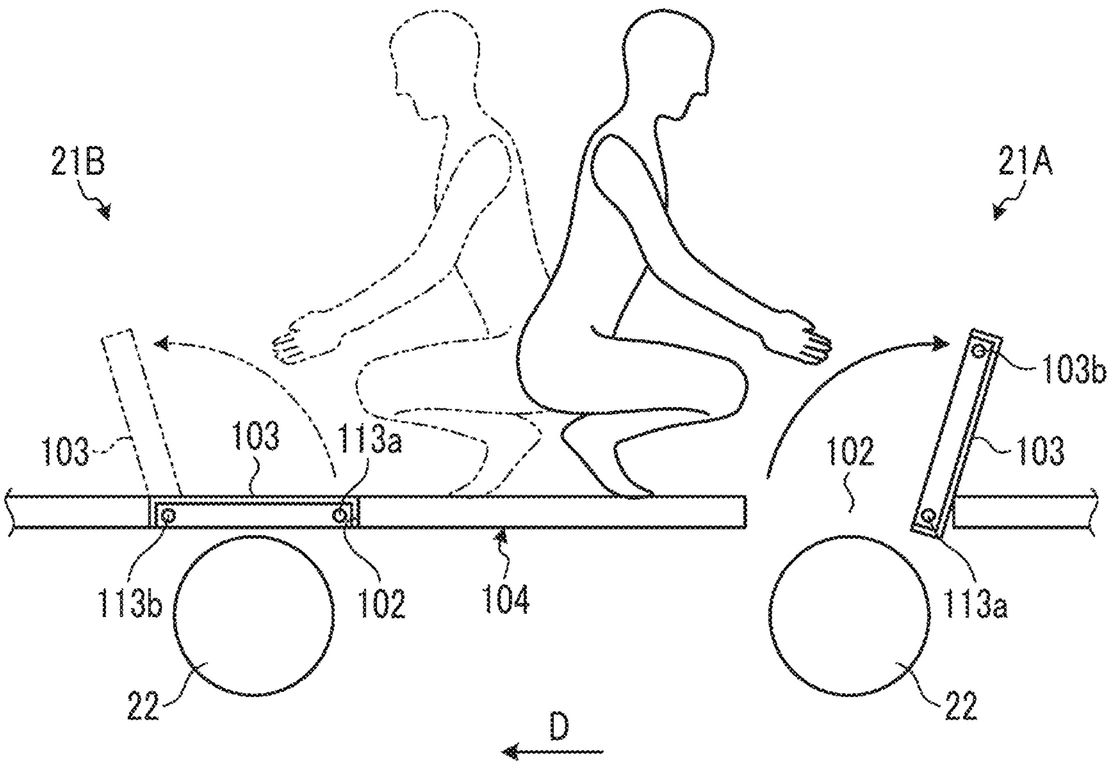
FIG. 9 is a schematic view showing a modification example of a first cover.

Further, the configuration of the first cover 103 is not limited to the configuration described above. FIG. 9 is a schematic view showing a modification example of the first cover.

As shown in FIG. 9, in the foothold 104E having the flat upper surface, the first cover 103 can open and close the work opening 102 for the printing cylinder. The first cover 103 is supported to be rotationally movable by the foothold 104E by supporting shafts 113*a* and 113*b* along the width direction W on the upstream side and the downstream side in the transfer direction D. In this case, the supporting shafts 113*a* and 113*b* of the first cover 103 can be locked and unlocked by, for example, a hook (not shown) provided on the foothold 104E. When the operator attempts to open the first cover 103 to the upper side from the supporting shaft 113*b* side, the hook on the supporting shaft 113*b* side is unlocked, and the first cover 103 rotationally moves to the upper side with the supporting shaft 113*a* as a fulcrum. On the other hand, when the operator attempts to open the first cover 103 to the upper side from the supporting shaft 113*a* side, the hook on the supporting shaft 113*a* side is unlocked, and the first cover 103 rotationally moves to the upper side with the supporting shaft 113*b* as a fulcrum.

The operator moves the foothold 104E to move between the printing unit 21A and the printing unit 21B when performing the printing plate replacement work of the printing unit 21A. The operator gets on the foothold 104E and opens the first cover 103 of the printing unit 21A on the upstream side in the transfer direction D. Here, the operator opens the first cover 103 to the upper side with the supporting shaft 113*a* as a fulcrum, and performs the printing plate replacement work through the work opening 102 for the printing cylinder. When the printing plate replacement work of the printing unit 21A ends, the operator closes the work opening 102 for the printing cylinder by the first cover 103.

The operator turns around and faces the printing unit 21B side when performing the printing plate replacement work of the printing unit 21B following the printing plate replacement work of the printing unit 21A. The operator opens the first cover 103 of the printing unit 21B on the downstream side in the transfer direction D while getting on the foothold 104E. Here, the operator opens the first cover 103 to the upper side with the supporting shaft 113*b* as a fulcrum, and performs the printing plate replacement work through the work opening 102 for the printing cylinder. When the printing plate replacement work of the printing unit 21B ends, the operator closes the work opening 102 for the printing cylinder by the first cover 103.

<Ink Supply Section>

Figure 10:
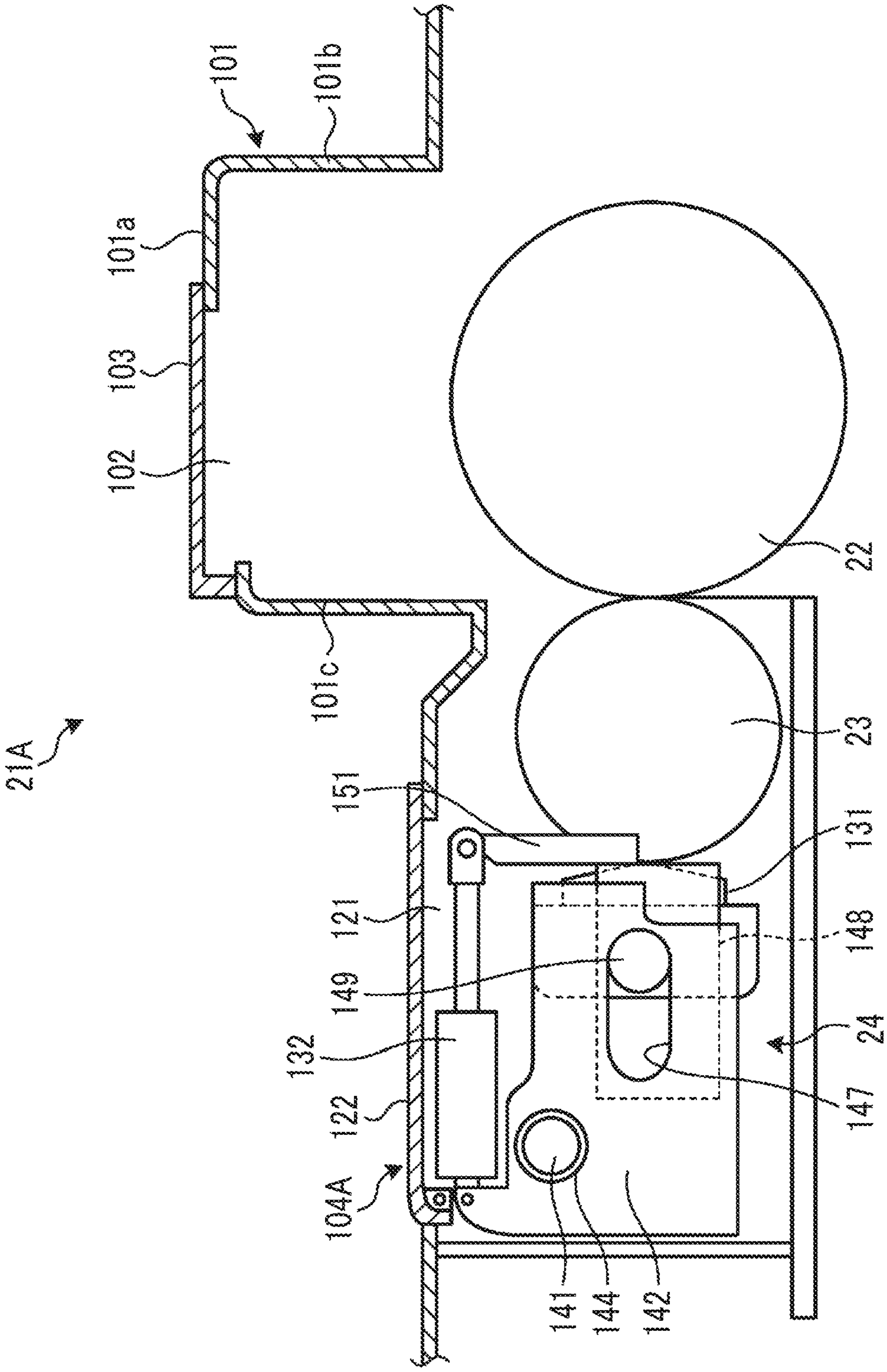
FIG. 10 is a schematic view showing details of the printing unit.
Figure 11:
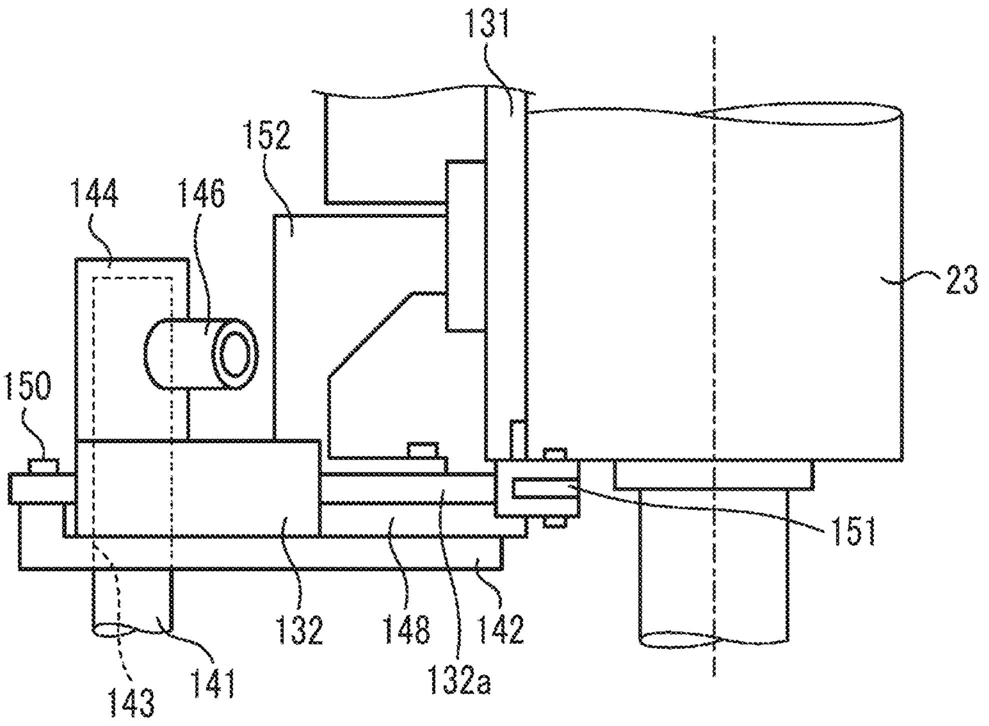
FIG. 11 is a plan view showing an ink supply section in the printing unit.
Figure 12:
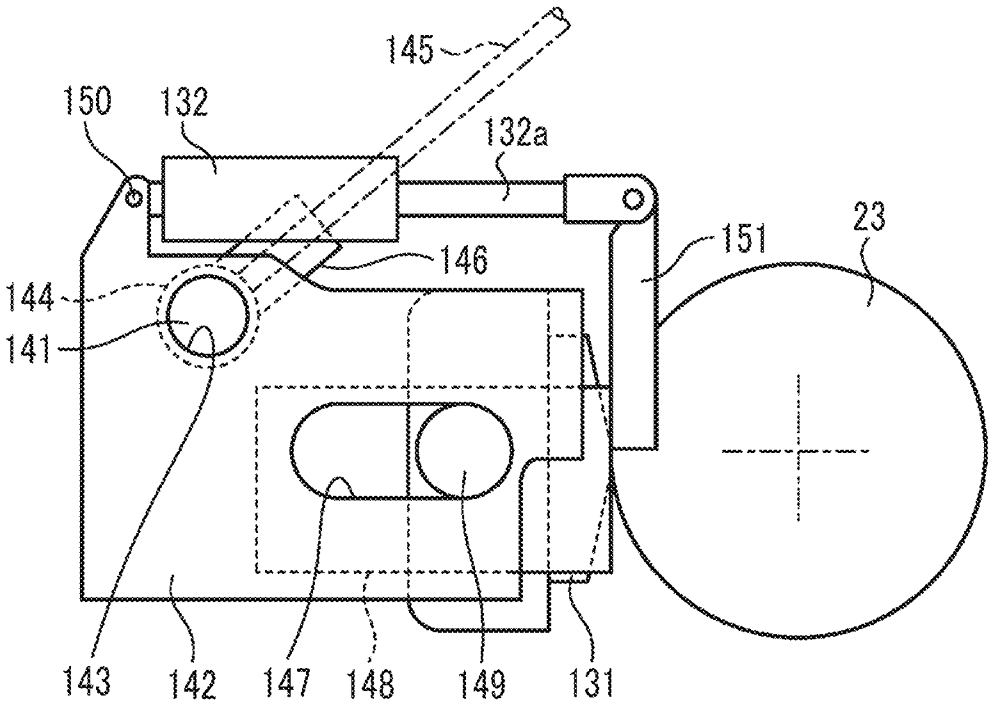
FIG. 12 is a side view showing the ink supply section in the printing unit.
Figure 13:
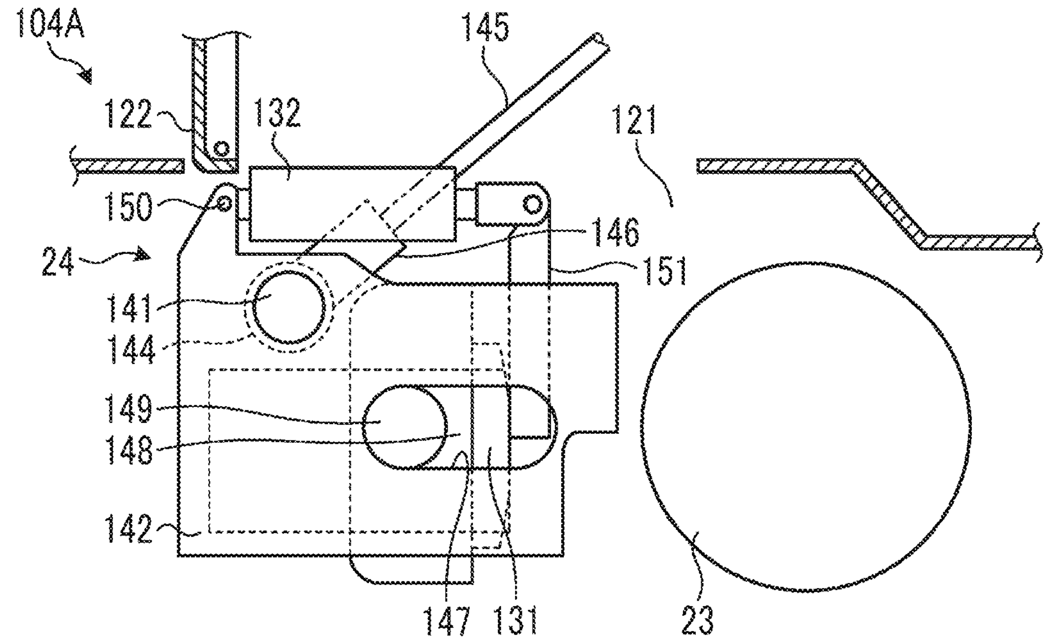
FIG. 13 is a schematic view showing maintenance work of the ink supply section.
Figure 14:
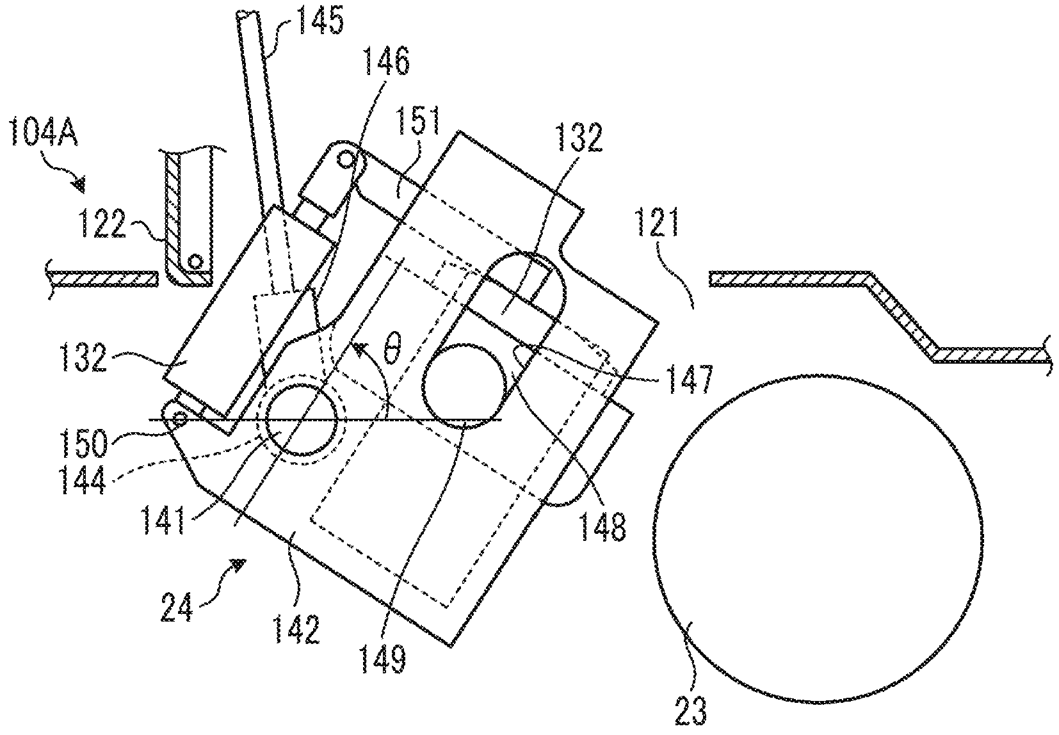
FIG. 14 is a schematic view showing the maintenance work of the ink supply section.
Figure 15:
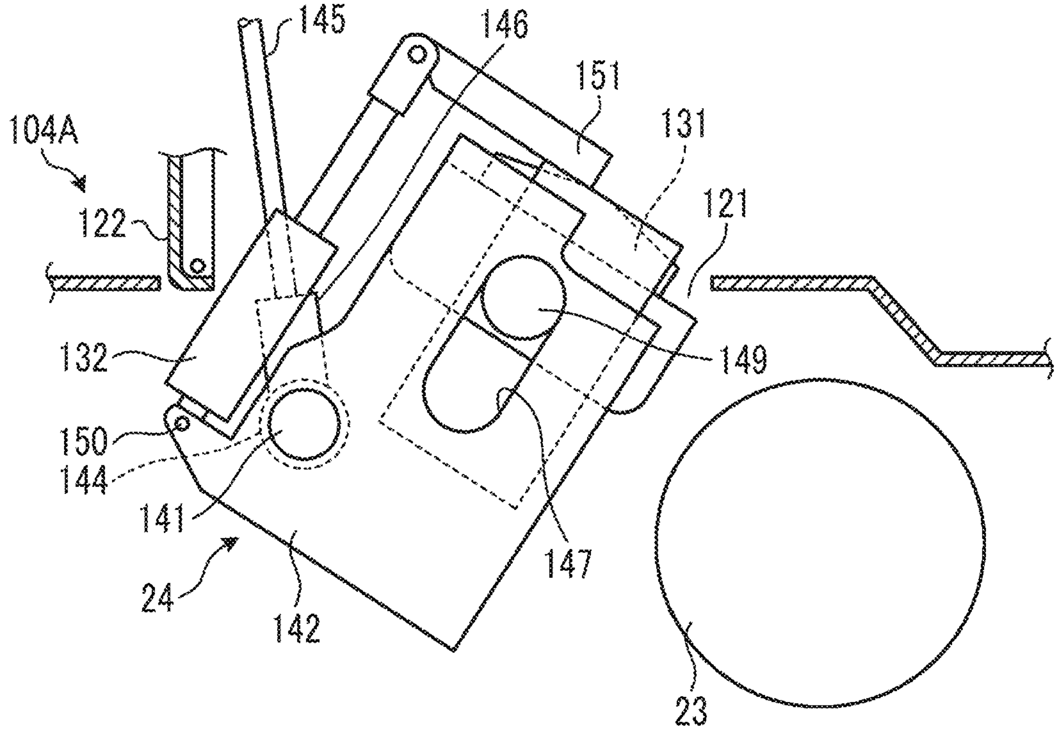
FIG. 15 is a schematic view showing the maintenance work of the ink supply section.

Here, the ink supply section 24 will be described in detail. FIG. 10 is a schematic view showing details of the printing unit, FIG. 11 is a plan view showing the ink supply section in the printing unit, FIG. 12 is a side view showing the ink supply section in the printing unit, and FIGS. 13 to 15 are schematic views showing maintenance work of the ink supply section.

As shown in FIGS. 4 and 10, the printing unit 21A includes the printing cylinder 22, the ink supply roll 23, the ink supply section 24, and the impression roll 25. The printing cylinder 22 is accommodated inside the housing 101. The housing 101 is provided with the first cover 103 that can open and close the work opening 102 for the printing cylinder. The ink supply roll 23 and the ink supply section 24 are disposed below the foothold 104A. The foothold 104A is provided with the work opening 121 for the ink supply section provided above the ink supply section 24 and the second cover 122 that can open and close the work opening 121 for the ink supply section. The second cover 122 can be opened and closed by a hand of the operator. It should be noted that, in FIG. 10, the flange portions 111, 112, and 123 are not shown.

The ink supply section 24 can move between a printing position at which the ink supply section 24 contacts with the ink supply roll 23 and a work position at which the work can be performed from the work opening 121 for the ink supply section, and in this case, the ink supply section 24 can move between a storage position and an exposure position which is one of the work position. Here, the storage position is a position at which the ink supply section 24 is disposed below the foothold 104A. The exposure position is a position at which the ink supply section 24 moves to the upper side in the foothold 104A in the vertical direction, and at least a part of the ink supply section 24 is exposed to the upper side through the work opening 121 for the ink supply section.

The ink supply section 24 includes an ink chamber 131 and an air cylinder 132. The ink chamber 131 supplies the stored ink to the ink supply roll 23. The air cylinder 132 can move between an ink supply position at which the ink chamber 131 closely contacts with the ink supply roll 23 and a retract position at which the ink chamber 131 is separated from the ink supply roll 23. As will be described below, an end portion of the ink supply section 24 is supported to be rotationally movable by the housing 101. Therefore, the storage position is a position at which the ink chamber 131 of the ink supply section 24 does not face the horizontal direction, that is, a side of the work opening 121 for the ink supply section. The exposure position is a position at which the ink supply section 24 rotationally moves to the upper side from the storage position and the ink chamber 131 faces the upper side in the vertical direction, that is, the side of the work opening 121 for the ink supply section.

It should be noted that the air cylinder 132 is not only be movable between the ink supply position at which the ink chamber 131 closely contacts with the ink supply roll 23 and the retract position at which the ink chamber 131 is separated from the ink supply roll 23. As will be described below, the air cylinder 132 can move the ink chamber 131 from the retract position to a maintenance position on the upper side in the vertical direction. In addition, the air cylinder 132 applies an appropriate pressurizing force when the ink chamber 131 closely contacts with the ink supply roll 23.

In addition, the ink supply section 24 can move the ink chamber 131 between the exposure position and the maintenance position. Here, at the exposure position of the ink chamber 131, the ink chamber 131 is in a state of being maintained at the retract position when the ink supply section 24 is positioned at the exposure position. In addition, the maintenance position of the ink chamber 131 is a position at which at least a part of the ink chamber 131 is disposed above the foothold 104A in the vertical direction. That is, the maintenance position is a position at which the ink chamber 131 faces the side of the work opening 121 for the ink supply section and at least a part of the ink chamber 131 is disposed above the foothold 104A in the vertical direction. Specifically, when the ink supply section 24 is positioned at the exposure position at which the ink supply section 24 rotationally moves to the upper side, the ink chamber 131 can move from the retract position to the maintenance position on the upper side in the vertical direction by operating the air cylinder 132. It should be noted that the air cylinder 132 may change a stroke when moving the ink chamber 131 from the retract position to the ink supply position and a stroke when moving the ink chamber 131 from the exposure position to the maintenance position. In this case, the stroke when moving the ink chamber 131 from the exposure position to the maintenance position is longer than the stroke when moving the ink chamber 131 from the retract position to the ink supply position. As a result, the maintenance position of the ink chamber 131 is a position close to the operator, so that work, such as the maintenance of the ink chamber 131, can be easily performed.

As shown in FIGS. 11 and 12, a pair of supporting shafts 141 are fixed by a frame along the width direction W on both sides in the width direction W. In addition, a pair of base plates 142 are disposed along the vertical direction on both sides in the width direction W. In the base plate 142, a support hole 143 is formed along the width direction W, and a supporting cylinder 144 with a bottom is fixed to the position of the support hole 143 along the width direction W. In the base plate 142, each supporting shaft 141 is fitted to the supporting cylinder 144 through the support hole 143 from an outer side in the width direction W. Therefore, the base plate 142 is supported to be rotationally movable up and down around a supporting shaft 141 along the width direction W. It should be noted that a jig insertion cylinder 146 into which a jig 145 can be inserted is fixed to the supporting cylinder 144.

In the base plate 142, a guide hole 147 penetrating along the width direction W is formed along the transfer direction D. A slide plate 148 is disposed close to the base plate 142, and a guide shaft 149 along the width direction W is fixed. In the slide plate 148, the guide shaft 149 is inserted into the guide hole 147 of the base plate 142. The air cylinder 132 is disposed along the transfer direction D, and a base end portion thereof is connected to an upper portion of the base plate 142 by a connection shaft 150. In the air cylinder 132, a distal end portion of a drive rod 132*a* is connected to the slide plate 148 via a connection member 151 along the vertical direction. An end portion of the ink chamber 131 in a longitudinal direction (width direction W) is connected to the slide plate 148 via a connection member 152. Therefore, when the air cylinder 132 is driven, the slide plate 148 can move along the guide hole 147 with respect to the base plate 142, and the ink chamber 131 can move in the same direction.

Therefore, as shown in FIG. 10, when the ink supply section 24 is positioned at the storage position below the foothold 104A, the ink chamber 131 can closely contact with the outer peripheral surface of the ink supply roll 23 to supply the ink to the ink supply roll 23. The operator needs to periodically perform the maintenance of the ink supply section 24. The maintenance includes cleaning work of the ink adhering to the ink chamber 131, and wear confirmation work and replacement work of a seal blade, a doctor blade, or an end seal mounted around the opening.

When the operator performs the maintenance of the ink supply section 24, the ink supply section 24 rotationally moves from the storage position to the exposure position, and then the ink chamber 131 moves from the retract position to the maintenance position. That is, as shown in FIG. 13, the operator gets on the foothold 104A or the housing 101 (see FIG. 7), first cleans and recovers the ink, operates the air cylinder 132, and then contracts the drive rod 132*a* to move the ink chamber 131 via the slide plate 148. Then, the ink chamber 131 moves from the ink supply position at which the ink chamber 131 closely contacts with the ink supply roll 23 to the retract position at which the ink chamber 131 is separated from the ink supply roll 23. Next, the second cover 122 is opened by a hand. Then, the operator inserts a distal end portion of the jig 145 into the jig insertion cylinder 146.

As shown in FIG. 14, the operator rotationally moves the ink supply section 24 together with the base plate 142 from the storage position to the exposure position by the jig 145. That is, in the ink supply section 24, by rotationally moving by an angle θ, the ink supply section 24 moves to the upper side in the vertical direction with respect to the foothold 104A, and at least a part of the ink supply section 24 is exposed to the outside through the work opening 121 for the ink supply section. In this case, the air cylinder 132 and the ink chamber 131 of the ink supply section 24 rotationally move in a state of maintaining the retract position described above. As shown in FIG. 15, the operator subsequently operates the air cylinder 132 and extends the drive rod 132*a* to move the ink chamber 131 via the slide plate 148. Then, the ink chamber 131 moves to the obliquely upward maintenance position. Here, the operator performs the maintenance of the ink chamber 131. In this case, the operator may perform various types of work by removing the ink chamber 131 from the connection member 152 of the slide plate 148, as necessary.

In the above description, the maintenance is performed in a state in which the ink supply section 24 rotationally moves from the storage position to the exposure position and the ink chamber 131 moves from the retract position to the maintenance position, but the present disclosure is not limited to this maintenance method. The operator may perform the maintenance in a state in which the ink supply section 24 rotationally moves from the storage position to the exposure position and the ink chamber 131 is maintained at the retract position. That is, the maintenance may be performed when the ink chamber 131 is positioned at the exposure position.

Therefore, it is not an essential configuration to move the ink chamber 131 from the retract position to the maintenance position as long as the operator can perform the maintenance. That is, the maintenance may be performed without operating the air cylinder 132.

When the maintenance of the ink chamber 131 ends, the ink chamber 131 moves to retract position from the maintenance position via the slide plate 148 by operating the air cylinder 132 to contract the drive rod 132*a*. That is, the air cylinder 132 and the ink chamber 131 are returned to the state in which the retract position is maintained. Next, the operator rotationally moves the ink supply section 24 from the exposure position to the storage position. Then, the distal end portion of the jig 145 is pulled out from the jig insertion cylinder 146, and the work opening 121 for the ink supply section is closed by the second cover 122.

<Modification Example of Ink Supply Section>

Figure 16:
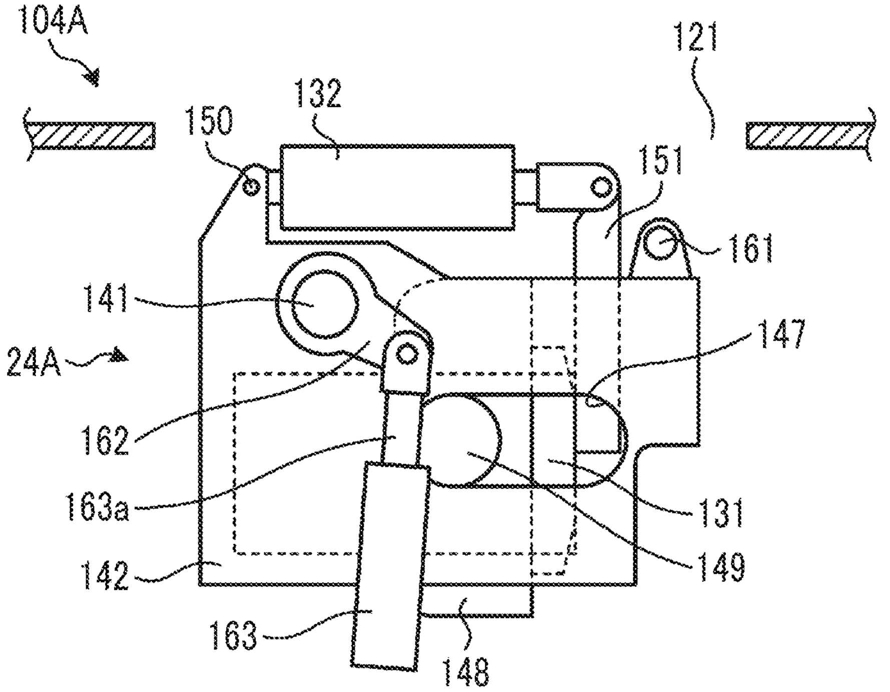
FIG. 16 is a side view showing a first modification example of the ink supply section.
Figure 18:
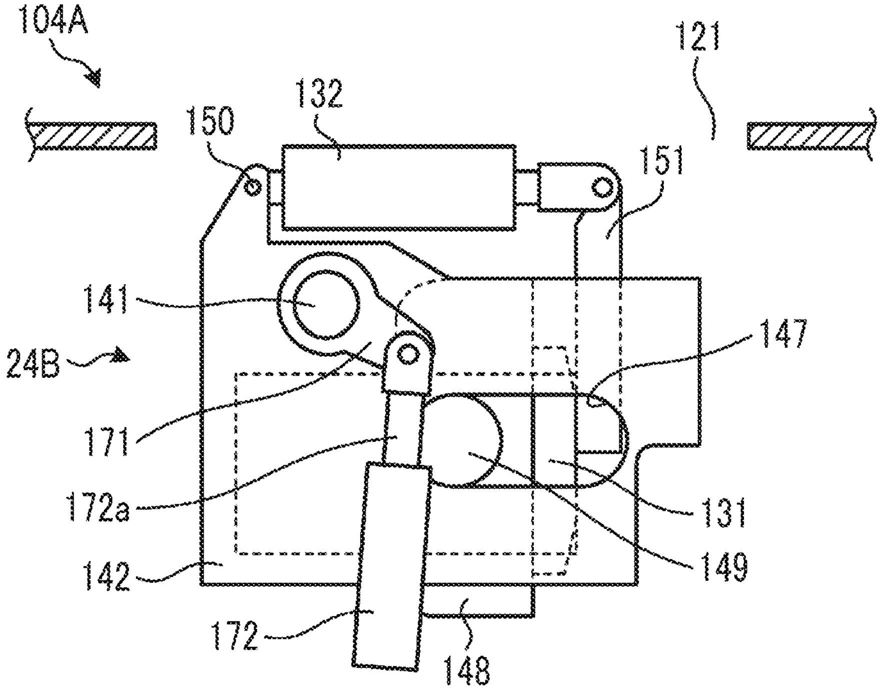
FIG. 18 is a side view showing a second modification example of the ink supply section.
Figure 19:
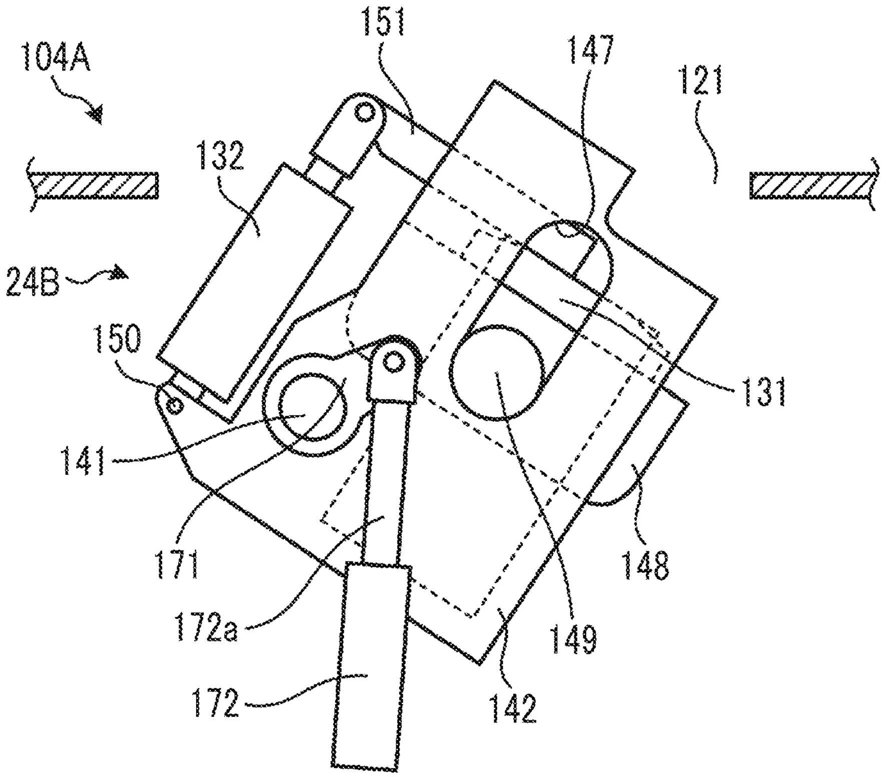
FIG. 19 is a schematic view showing the operating state of the ink supply section.
Figure 20:
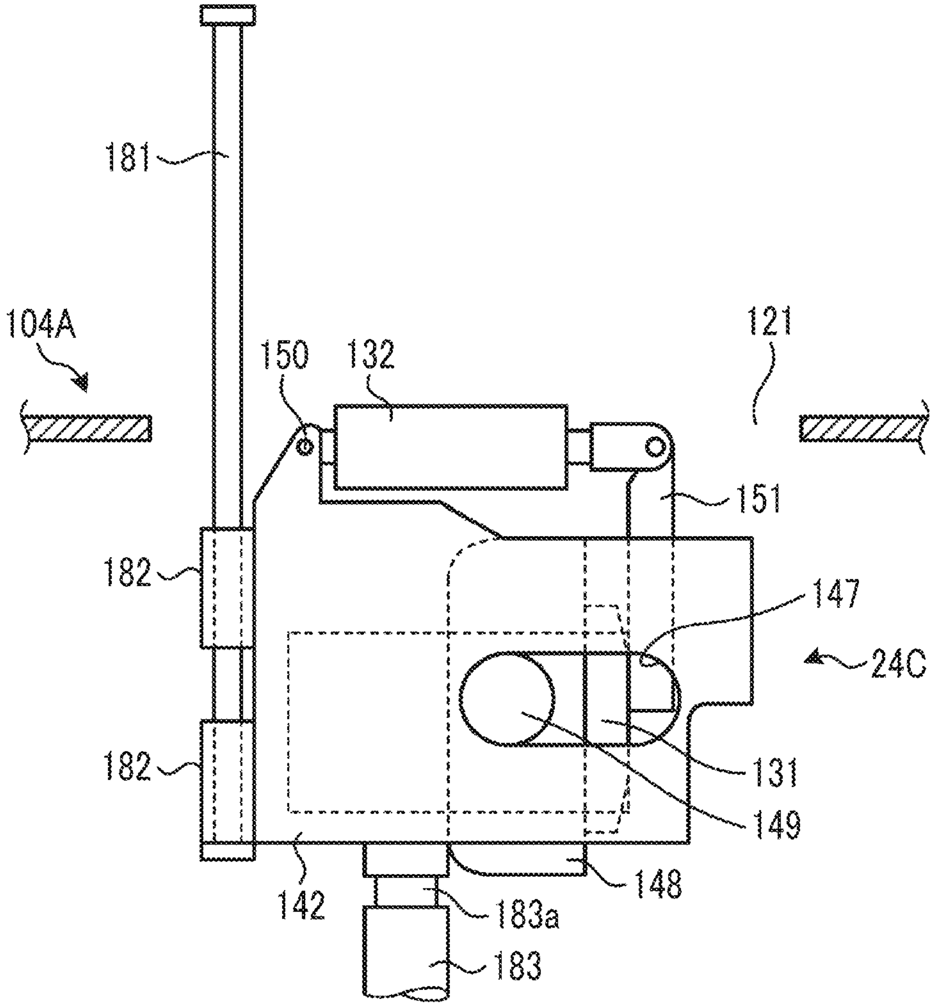
FIG. 20 is a side view showing a third modification example of the ink supply section.
Figure 21:
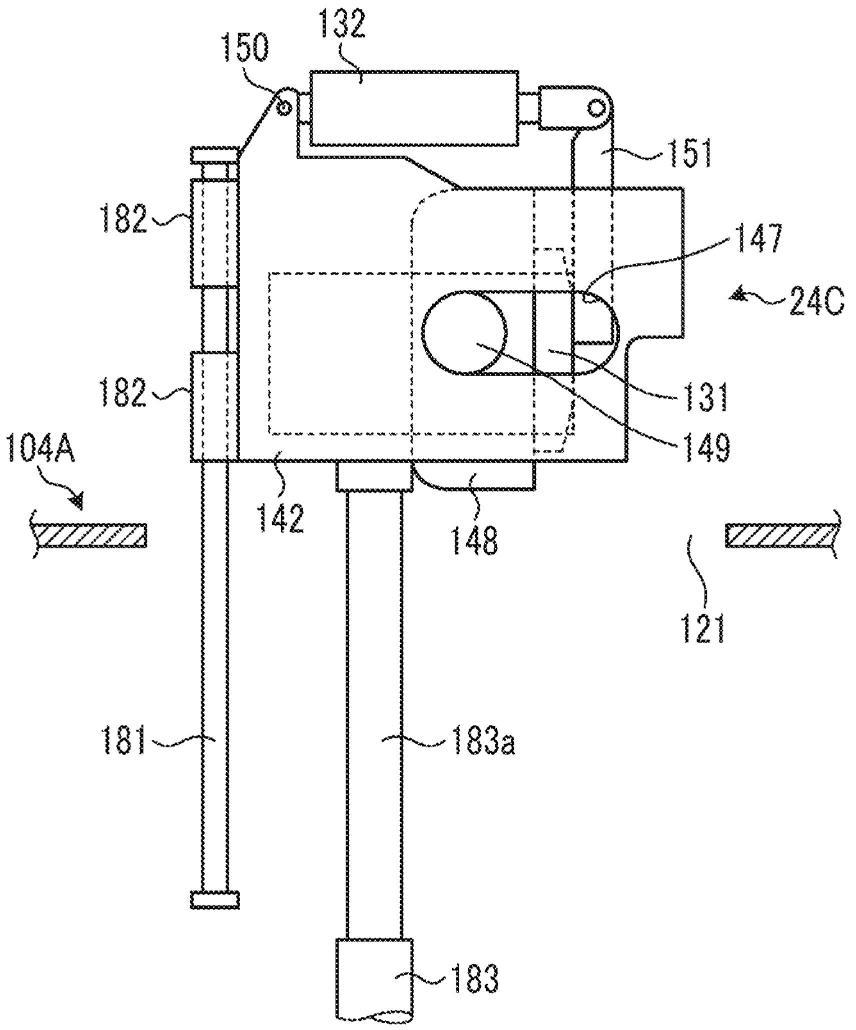
FIG. 21 is a schematic view showing the operating state of the ink supply section.

It should be noted that the ink supply section 24 is not limited to the configuration described above. FIG. 16 is a side view showing a first modification example of the ink supply section, FIG. 17 is a schematic view showing an operating state of the ink supply section, FIG. 18 is a side view showing a second modification example of the ink supply section, FIG. 19 is a schematic view showing the operating state of the ink supply section, FIG. 20 is a side view showing a third modification example of the ink supply section, and FIG. 21 is a schematic view showing the operating state of the ink supply section.

Figure 17:
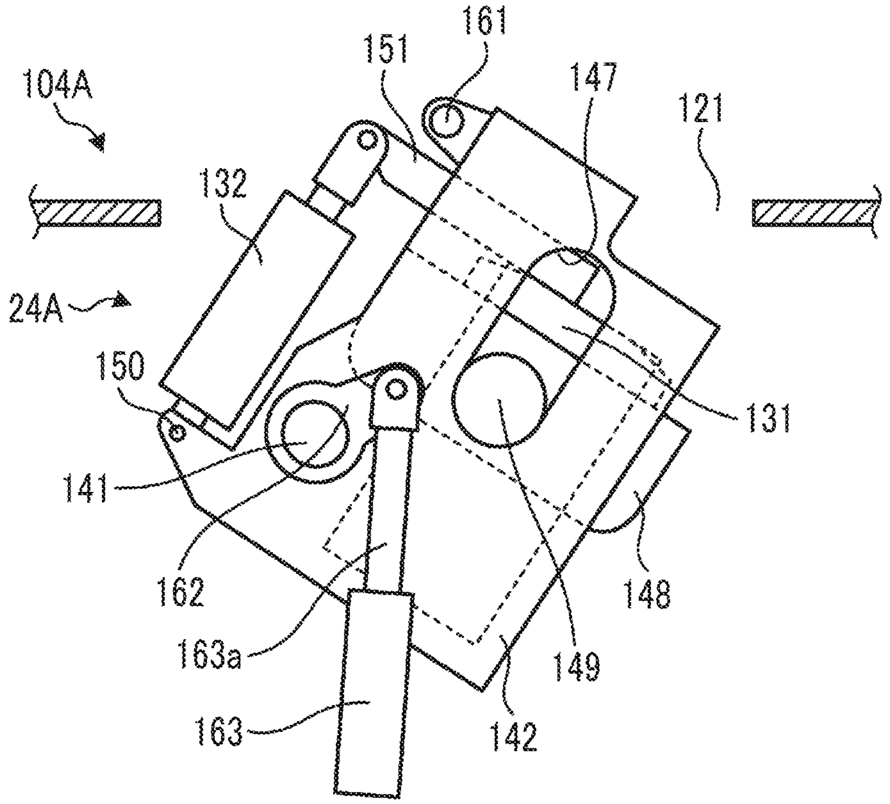
FIG. 17 is a schematic view showing an operating state of the ink supply section.

In the first modification example, as shown in FIGS. 16 and 17, an ink supply section 24A can move between a storage position at which the ink supply section 24A is disposed below the foothold 104A and an exposure position at which the ink supply section 24A moves to the upper side in the vertical direction with respect to the foothold 104A and at least a part of the ink supply section 24A is exposed to the upper side through the work opening 121 for the ink supply section. In addition, by operating the air cylinder 132, the ink chamber 131 can move from the exposure position (retract position) to the maintenance position at which at least a part of the ink chamber 131 is disposed above the foothold 104A in the vertical direction. It should be noted that the specific configuration of the ink supply section 24A is substantially the same as the configuration of the ink supply section 24 described above, and the description thereof will be omitted.

In the ink supply section 24A, one end portion of the base plate 142 is supported to be rotationally movable up and down by the supporting shaft 141 fixed to the frame (not shown). A handle 161 protruding to the upper side is fixed to the other end portion of the base plate 142. The handle 161 can be held by the operator on the foothold 104A through the work opening 121 for the ink supply section. In addition, one end portion of a connection lever 162 is supported to be rotationally movable by the supporting shaft 141 and is fixed to the base plate 142. A gas spring 163 is supported by a frame, and a distal end portion of an expansion rod 163*a* is connected to the other end portion of the connection lever 162. The gas spring 163 applies the urging force in a moving-up direction of the ink supply section 24A via the base plate 142.

Therefore, when the operator performs the maintenance of the ink supply section 24A, first, the air cylinder 132 is operated to move the ink chamber 131 from the ink supply position to the retract position. Next, the second cover 122 (see FIG. 10) is opened by a hand. Then, the operator holds the handle 161 by a hand and pulls the handle 161 to the upper side. Then, the ink supply section 24A rotationally moves from the storage position to the exposure position to be positioned above the foothold 104A, and at least a part of the ink supply section 24A is exposed to the outside through the work opening 121 for the ink supply section. In this case, even when the ink supply section 24A is a heavy object, the operator can move up the ink supply section 24A by a hand with a small operating force by being assisted by the urging force of the gas spring 163 from the foothold 104A.

Then, the operator operates the air cylinder 132 to move the ink chamber 131 from the retract position to the maintenance position. Here, the operator performs the maintenance of the ink chamber 131. When the maintenance of the ink chamber 131 ends, the ink chamber 131 moves from the maintenance position to the retract position. Then, the operator holds the handle 161 and rotationally moves an ink supply section 24B from the exposure position to the storage position, and closes the work opening 121 for the ink supply section by the second cover 122.

In the second modification example, as shown in FIGS. 18 and 19, in the ink supply section 24B, one end portion of the base plate 142 is supported to be rotationally movable up and down by the supporting shaft 141 fixed to the frame (not shown). One end portion of a connection lever 171 is supported to be rotationally movable by the supporting shaft 141 and is fixed to the base plate 142. An air cylinder 172 is supported by a frame, and a distal end portion of a drive rod 172*a* is connected to the other end portion of the connection lever 171.

Therefore, when the operator performs the maintenance of the ink supply section 24B, first, the air cylinder 132 is operated to move the ink chamber 131 from the ink supply position to the retract position. Next, the second cover 122 (see FIG. 10) is opened by a hand. Then, the operator operates the air cylinder 172 to extend the drive rod 172*a*. Then, the ink supply section 24B rotationally moves from the storage position to the exposure position to be positioned above the foothold 104A, and at least a part of the ink supply section 24B is exposed to the outside through the work opening 121 for the ink supply section. In this case, even when the ink supply section 24B is a heavy object, the ink supply section 24B can be easily moved up by operating the air cylinder 132.

In the third modification example, as shown in FIGS. 20 and 21, a guide rail 181 along the vertical direction is fixed to one side of an ink supply section 24C to a frame (not shown). Upper and lower guide members 182 are fixed to one end portion of the base plate 142. The upper and lower guide members 182 are supported to be movable by the guide rail 181. An air cylinder 183 is supported by a frame, and a distal end portion of a drive rod 183*a* is connected to a lower portion of the base plate 142.

Therefore, when the operator performs the maintenance of the ink supply section 24C, first, the air cylinder 132 is operated to move the ink chamber 131 from the ink supply position to the retract position. Next, the second cover 122 (see FIG. 10) is opened by a hand. Then, the operator operates the air cylinder 183 to extend the drive rod 183*a*. Then, the ink supply section 24C moves up from the storage position to the exposure position to be positioned above the foothold 104A, and at least a part of the ink supply section 24C is exposed to the outside through the work opening 121 for the ink supply section. In this case, even when the ink supply section 24C is a heavy object, the ink supply section 24C can be easily moved up by operating the air cylinder 183. It should be noted that, although not shown, the air cylinder 132 may be provided with a known elevating device, such as a rack and a pinion gear.

It should be noted that, as shown in FIG. 8, even when the flat foothold 104E is applied, the foothold 104E is provided with the work opening 121 for the ink supply section provided above the ink supply section 24 and the second cover 122 that can open and close the work opening 121 for the ink supply section. A plurality of flange portions 123 as reinforcing portions are fixed to the second cover 122 such that sufficient strength is secured.

The ink supply section 24 can move between the printing position at which the ink supply section 24 contacts with the ink supply roll 23 and the work position at which the work can be performed from the work opening 121 for the ink supply section, and in this case, the ink supply section 24 can move between the storage position and the exposure position which is one of the work position. The operator opens the second cover 122 when the maintenance of the ink supply section 24 is performed. Subsequently, the ink supply section 24 moves from the storage position to the exposure position to be positioned above the foothold 104E, and at least a part of the ink supply section 24 is exposed to the outside through the work opening 121 for the ink supply section (see FIGS. 14, 17, 19, and 21). Then, the operator moves the ink chamber 131 (see FIG. 15) from the retract position to the maintenance position, and performs the maintenance on the ink chamber 131. It should be noted that a configuration for moving the ink supply section 24 to the printing position at which the ink supply section 24 contacts with the ink supply roll 23 between the work position at which the work can be performed from the work opening 121 for the ink supply section is the same as the embodiment described above, and thus the description thereof will be omitted.

Actions and Effects of Present Embodiment

A first aspect relates to the printing device including the printing cylinder 22 on which the printing plate 26 is mountable, the ink supply roll 23 that is disposed on the upstream side or the downstream side of the printing cylinder 22 in the transfer direction D and is contactable with the printing cylinder 22, the ink supply sections 24 and 27 that are configured to supply the ink to the ink supply roll 23, the first cover 103 that covers the upper side of the printing cylinder 22 in a vertical direction and is openable and closable, and the footholds 104A, 104B, 104C, 104D, and 104E that cover the upper side of the ink supply roll 23 in the vertical direction and on which the operator is able to perform the work.

With the printing device according to the first aspect, the first cover 103 that covers the upper side of the printing cylinder 22 is provided and the first cover 103 can be opened and closed, so that it is possible to easily perform the replacement work of the printing plate 26 or the like for the printing cylinder 22. In addition, the ink supply roll 23 is disposed below the footholds 104A, 104B, 104C, 104D, and 104E, so that it is possible to reduce the total length of the printing section 21, and it is possible to reduce the size of the device.

A second aspect relates to the printing device, in which the footholds 104A, 104B, 104C, 104D, and 104E are provided with the work opening 102 for the printing cylinder above the printing cylinder 22 in the vertical direction, and the first cover 103 is configured to open and close the work opening 102 for the printing cylinder. As a result, it is possible to improve the workability of the replacement work of the printing plate 26 or the like for the printing cylinder 22.

A third aspect relates to the printing device, in which the footholds 104A, 104B, 104C, 104D, and 104E and the first cover 103 are provided with the reinforcing portion on which the operator is able to walk. As a result, it is possible for the operator to walk and move on the footholds 104A, 104B, 104C, 104D, and 104E and the first cover 103, and it is possible to improve the workability of the printing plate replacement work for a plurality of the printing units 21A, 21B, 21C, and 21D.

A fourth aspect relates to the printing device, in which the housing 101 that covers the upper side of the printing cylinder 22 in the vertical direction and the upstream side and the downstream side in the transfer direction D is disposed, the work opening 102 for the printing cylinder is provided in the upper portion of the housing 101, and the first cover 103 is configured to open and close the work opening 102 for the printing cylinder. As a result, the printing cylinder 22 is disposed inside the housing 101, and the work opening 102 for the printing cylinder provided above the upper portion of the housing 101 can be opened and closed by the first cover 103, so that it is possible to efficiently dispose the printing cylinder 22, and it is possible to improve the workability of the replacement work of the printing plate 26 or the like for the printing cylinder 22.

A fifth aspect relates to the printing device, in which the upper portion of the housing 101 and the first cover 103 are provided with the reinforcing portion on which the operator is able to walk. As a result, it is possible for the operator to walk on the first cover 103 and move between the footholds 104A, 104B, 104C, and 104D, and it is possible to improve the workability of the printing plate replacement work or the like for the plurality of printing units 21A, 21B, 21C, and 21D.

A sixth aspect relates to the printing device, in which the first cover 103 is disposed on an upper side of the footholds 104A, 104B, 104C, and 104D in the vertical direction. As a result, the operator who gets on the footholds 104A, 104B, 104C, and 104D opens the first cover 103 positioned at a position higher than the footholds 104A, 104B, 104C, and 104D to perform the printing plate replacement work, so that it is possible to improve the workability.

A seventh aspect relates to the printing device, in which the printing cylinder 22 is supported to be movable between the printing position at which the printing cylinder 22 contacts with the ink supply roll 23 and the work position at which the printing cylinder 22 moves up from the printing position and the work is enabled from the work opening 102 for the printing cylinder. As a result, the printing cylinder 22 moves up from the printing position, so that it is possible for the operator to access the printing cylinder 22 at this position, and it is possible to improve the workability of the printing plate replacement work.

An eighth aspect relates to the printing device, in which the staircase on which the operator is able to move up and down is disposed on the footholds 104A, 104B, 104C, 104D, and 104E, and the printing plate storage place 108 on which the operator is able to take in and out the printing plate 26 from the footholds 104A, 104B, 104C, 104D, and 104E is disposed. As a result, it is possible for the operator to easily move between the footholds 104A, 104B, 104C, 104D, and 104E, the printing plate storage place 108, and the printing units 21A, 21B, 21C, and 21D during work, such as the printing plate replacement work, and it is possible to improve the workability.

A ninth aspect relates to the printing device, in which the first cover 103 is openable and closable from at least any one of the upstream side and the downstream side of the printing cylinder 22 in the transfer direction D. As a result, it is possible for the operator to access the printing cylinder 22 from the upstream side or the downstream side in the transfer direction D.

A tenth aspect relates to the printing device, in which a locking mechanism that prevents the first cover 103 from being opened while the printing cylinder 22 is in operation is provided. As a result, it is possible to improve the safety.

An eleventh aspect relates to the printing device, in which the ink supply sections 24 and 27 are disposed below the footholds 104A, 104B, 104C, 104D, and 104E, and the footholds 104A, 104B, 104C, 104D, and 104E are provided with the work opening 121 for the ink supply section that is provided above the ink supply sections 24 and 27 in the vertical direction and the second cover 122 that is configured to open and close the work opening 121 for the ink supply section. As a result, the total length of the printing section 21 can be reduced, and the ink supply sections 24 and 27 can be accessed from the work opening 121 for the ink supply section when the operator opens the second cover 122, so that it is possible to improve the workability of work, such as the maintenance of the ink supply sections 24 and 27.

A twelfth aspect relates to the printing device, in which the ink supply section 24 is supported to be movable between the printing position at which the ink supply section 24 contacts with the ink supply roll 23 and the work position at which the work is enabled from the work opening 121 for the ink supply section. As a result, the ink supply section 24 moves from the printing position to the work position, so that it is possible for the operator to access the ink supply section 24 at the work position and to easily perform the work, such as the maintenance of the ink supply section 24.

A thirteenth aspect relates to a printer, in which the plurality of printing units 21A, 21B, 21C, and 21D are disposed at predetermined intervals in the transfer direction D, and the footholds 104A, 104B, 104C, 104D, and 104E are disposed above the plurality of printing units 21A, 21B, 21C, and 21D. As a result, it is possible to reduce the total length of the printing section 21, and it is possible to reduce the size of the device.

A fourteenth aspect relates to a box making machine including the feeding section 11, the printing section 21, the slotter creaser section 31, the die cutting section 41, the folding section 51, and the counter-ejector section 61. As a result, it is possible to reduce the total length of the printing section 21, and it is possible to reduce the size of the device.

It should be noted that, in the embodiment described above, the four footholds 104A, 104B, 104C, and 104D are provided respectively for the four printing units 21A, 21B, 21C, and 21D, the number is not limited to four, and may be three or less or five or more. In addition, the numbers of the footholds 104A, 104B, 104C, and 104D are the same as the number of the printing units 21A, 21B, 21C, and 21D, but the number of the footholds 104A, 104B, 104C, and 104D may be smaller or larger than the number of the printing units 21A, 21B, 21C, and 21D.

In addition, in the embodiment described above, the ink supply roll 23 is disposed on the downstream side of the printing cylinder 22 in the transfer direction D, but may be disposed on the upstream side. In addition, the printing cylinder 22 can move up and down, but the printing plate 26 may be replaceable at the printing position.

In addition, in the embodiment described above, the first cover 103 and the second cover 122 can be manually opened and closed, but the first cover 103 and the second cover 122 may be automatically openable and closable by a fluid pressure cylinder, a motor, or the like. In addition, the ink supply section 24 can be manually opened and closed, but may be automatically openable and closable by a fluid pressure cylinder, a motor, or the like.

In addition, in the embodiment described above, the box making machine 10 includes the feeding section 11, the printing section 21, the slotter creaser section 31, the die cutting section 41, the folding section 51, and the counter-ejector section 61, but the present disclosure is not limited to this configuration. For example, the presence or absence of the printing section 21, the die cutting section 41, the folding section 51, and the counter-ejector section 61 is not limited.

In addition, in the embodiment described above, the ink supply section 24 can move between the printing position at which the ink supply section 24 contacts with the ink supply roll 23 and the work position at which the work can be performed from the work opening 121 for the ink supply section, and the ink supply section 24 can move between the storage position and the exposure position which is one of the work position, but the present disclosure is not limited to this. As long as the operator can perform the work from the work opening 121 for the ink supply section, above the footholds 104A, 104B, 104C, 104D, and 104E, instead of the exposure position at which at least a part of the ink supply section 24 is exposed to the outside through the work opening 121 for the ink supply section, the ink supply section 24 may be positioned below the foothold.

Figure 22:
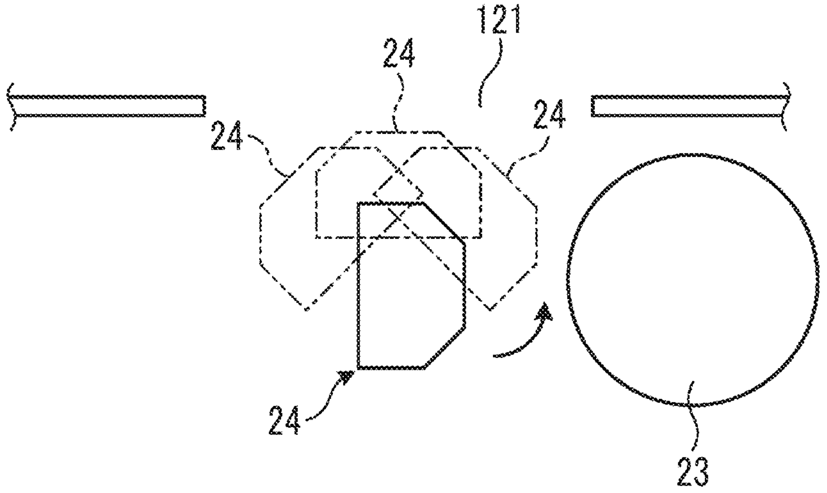
FIG. 22 is a schematic view showing a modification example of the operating state of the ink supply section.

FIG. 22 is a schematic view showing a modification example of the operating state of the ink supply section.

For example, as shown in FIG. 22, first, below the foothold, the ink supply section 24 (ink chamber 131) moves from the printing position (ink supply position at which the ink chamber 131 closely contacts with the ink supply roll 23 by predetermined pressurizing force) at which the ink supply section 24 contacts with the ink supply roll 23 to the retract position at which at least the ink chamber 131 is separated from the ink supply roll 23. Next, by applying the embodiment described above, the ink supply section 24 rotationally moves at the position at which the ink chamber 131 faces the upper side in the vertical direction, that is, the side of the work opening 121 for the ink supply section. In this case, at the work position, a state is established in which the ink chamber 131 faces the side of the work opening 121 for the ink supply section. It should be noted that, in FIG. 22, the three movement positions of the ink supply section 24 are represented by two-dot chain lines. That is, as long as the ink chamber 131 faces the side of the work opening 121 for the ink supply section, the position at which the ink supply section 24 rotationally moves is not limited. In this way, since the ink chamber 131 faces the side of the work opening 121 for the ink supply section, even when the ink supply section 24 is positioned below the foothold, the operator can perform the work from the work opening 121 for the ink supply section.

REFERENCE SIGNS LIST

10: box making machine
11: feeding section
12: table
13: front guide
14: feed roller
15: suction device
16: feed roll
21: printing section (printer)
21A, 21B, 21C, 21D: printing unit (printing device)
22: printing cylinder
23: ink supply roll
24, 24A, 24B, 24C, 27: ink supply section
25: impression roll
26: printing plate
31: slotter creaser section
32: first creasing roll
33: second creasing roll
34: slitter head
35: slotter head
41: die cutting section
51: folding section
61: counter-ejector section
101: housing
101*a*: ceiling
101*b*, 101*c*: vertical wall portion
102: work opening for printing cylinder
103: first cover
104A, 104B, 104C, 104D, 104E: foothold
105: handrail
106: printing plate holding brush
107: staircase
108: printing plate storage place
111, 112, 123: flange portion (reinforcing portion)
113, 113*a*, 113*b*: supporting shaft
114: gas spring
121: work opening for ink supply section
122: second cover
131: ink chamber
132: air cylinder
141: supporting shaft
142: base plate
143: support hole
144: supporting cylinder
145: jig
146: jig insertion cylinder
147: guide hole
148: slide plate
149: guide shaft
150: connection shaft
151: connection member

161: handle
162: connection lever
163: gas spring
171: connection lever
172: air cylinder
181: guide rail
182: guide member
183: air cylinder
D: transfer direction (sheet transfer direction)
W: width direction

The invention claimed is:

1. A printing device comprising:
a printing cylinder on which a printing plate is mountable;
an ink supply roll that is disposed on an upstream side or a downstream side of the printing cylinder in a sheet transfer direction and is contactable with the printing cylinder;
an ink supply section that is configured to supply ink to the ink supply roll;
a first cover that covers an upper side of the printing cylinder in a vertical direction and is openable and closable; and
a foothold that covers an upper side of the ink supply roll in the vertical direction and on which an operator is able to perform work.

2. The printing device according to claim 1,
wherein the foothold is provided with a work opening for the printing cylinder above the printing cylinder in the vertical direction, and the first cover is configured to open and close the work opening for the printing cylinder.

3. The printing device according to claim 2,
wherein the foothold and the first cover are provided with a reinforcing portion on which the operator is able to walk.

4. The printing device according to claim 1,
wherein a housing that covers the upper side of the printing cylinder in the vertical direction and the upstream side and the downstream side in the sheet transfer direction is disposed, a work opening for the printing cylinder is provided in an upper portion of the housing, and the first cover is configured to open and close the work opening for the printing cylinder.

5. The printing device according to claim 4,
wherein the upper portion of the housing and the first cover are provided with a reinforcing portion on which the operator is able to walk.

6. The printing device according to claim 4,
wherein the first cover is disposed on an upper side of the foothold in the vertical direction.

7. The printing device according to claim 2,
wherein the printing cylinder is supported to be movable between a printing position at which the printing cylinder contacts with the ink supply roll and a work position at which the printing cylinder moves up from the printing position and work is enabled from the work opening for the printing cylinder.

8. The printing device according to claim 1,
wherein a staircase on which the operator is able to move up and down is disposed on the foothold, and a printing plate storage place on which the operator is able to take in and out the printing plate from the foothold is disposed.

9. The printing device according to claim 1,
wherein the first cover is openable and closable from at least any one of the upstream side and the downstream side in the sheet transfer direction.

10. The printing device according to claim 1,
wherein a locking mechanism that prevents the first cover from being opened while the printing cylinder is in operation is provided.

11. The printing device according to claim 1,
wherein the ink supply section is disposed below the foothold, and
the foothold is provided with a work opening for the ink supply section that is provided above the ink supply section in the vertical direction and a second cover that is configured to open and close the work opening for the ink supply section.

12. The printing device according to claim 11,
wherein the ink supply section is supported to be movable between a printing position at which the ink supply section contacts with the ink supply roll and a work position at which work is enabled from the work opening for the ink supply section.

13. A printer in which a plurality of the printing devices according claim 1 are disposed at predetermined intervals in the sheet transfer direction, and the foothold is disposed above the plurality of printing devices.

14. A box making machine comprising:
a feeding section that supplies a sheet;
a printing section that performs printing on the sheet;
a slotter creaser section that performs end portion cutting processing, creasing line processing, and grooving processing on the sheet;
a folding section that folds the sheet and joins end portions to form a box body; and
a counter-ejector section that stacks the box bodies while counting the number of the box bodies, and then ejects the box bodies for each predetermined number,
wherein the printing section includes the printer according to claim 13.

15. The printing device according to claim 4, wherein the printing cylinder is supported to be movable between a printing position at which the printing cylinder contacts with the ink supply roll and a work position at which the printing cylinder moves up from the printing position and work is enabled from the work opening for the printing cylinder.

* * * * *